US012609061B2

(12) United States Patent
Johannesson et al.

(10) Patent No.: US 12,609,061 B2
(45) Date of Patent: Apr. 21, 2026

(54) METHOD AND ARRANGEMENTS FOR PROVISION OF PIXEL VALUES FOR READOUT FROM AN IMAGE SENSOR

(71) Applicant: SICK IVP AB, Linköping (SE)

(72) Inventors: Mattias Johannesson, Linköping (SE); Johan Melander, Linköping (SE)

(73) Assignee: Sick IVP AB, Linköping (SE)

( * ) Notice: Subject to any disclaimer, the term of this patent is extended or adjusted under 35 U.S.C. 154(b) by 195 days.

(21) Appl. No.: 18/300,857

(22) Filed: Apr. 14, 2023

(65) Prior Publication Data

US 2023/0335027 A1    Oct. 19, 2023

(30) Foreign Application Priority Data

Apr. 19, 2022    (EP) ..................................... 22168918

(51) Int. Cl.
| | |
|---|---|
| *G09G 3/00* | (2006.01) |
| *G09G 3/06* | (2006.01) |
| *H04N 25/40* | (2023.01) |
| *H04N 25/46* | (2023.01) |
| *H04N 25/47* | (2023.01) |

(52) U.S. Cl.
CPC .............. *G09G 3/007* (2013.01); *G09G 3/06* (2013.01); *H04N 25/41* (2023.01); *H04N 25/46* (2023.01); *H04N 25/47* (2023.01); *G09G 2320/0295* (2013.01); *G09G 2360/142* (2013.01)

(58) Field of Classification Search
CPC .. G09G 3/06; G09G 3/007; G09G 2320/0295; G09G 2360/142; H04N 25/41; H04N 25/46; H04N 25/47
See application file for complete search history.

(56) References Cited

U.S. PATENT DOCUMENTS

| | | |
|---|---|---|
| 2015/0358571 A1 | 12/2015 | Dominguez |
| 2021/0006738 A1 | 1/2021 | Matsui |
| 2021/0258452 A1* | 8/2021 | Johannesson ........ H04N 25/768 |

FOREIGN PATENT DOCUMENTS

| | | |
|---|---|---|
| EP | 2760198 | 12/2020 |

* cited by examiner

*Primary Examiner* — Priyank J Shah
(74) *Attorney, Agent, or Firm* — DUANE MORRIS LLP; Gregory M. Lefkowitz; Daniel J. Tarr

(57) ABSTRACT

Method and arrangements (431; 433; 1000), for provision of pixel values for readout from pixels of an image sensor (431). It is obtained (501) information indicating a threshold pixel value and a window at, or around, maximum, WAM, width (257; 357; 657) corresponding to a number of pixels. Pixels of the image sensor (431) are exposed whereby the exposed pixels attain analogue pixel values. It is identified (503) a pixel (255; 355; 655) in respective image sensor column (252; 352) whose analogue pixel value during said exposure was first in said respective column (252; 352) to reach or pass said threshold pixel value. Said identified respective pixel group (255; 355; 655) is associated (505) with a respective certain WAM position of a respective WAM (258; 358; 658) in said respective image sensor column (252; 352) with said WAM width (257; 357; 657). It is provided (506), for parallel readout per WAM position and based on said exposure, pixel values of pixels associated with the same WAM position (364; 664) in their respective WAM (258; 358; 658).

14 Claims, 12 Drawing Sheets

WAM ROW 1 (M COLUMS)

METHOD AND ARRANGEMENTS FOR PROVISION OF PIXEL VALUES FOR READOUT FROM AN IMAGE SENSOR

TECHNICAL FIELD

Embodiments herein concern a method and arrangements for provision of pixel values for readout from an image sensor, particularly pixel values resulting from exposure of light reflected from an object as part of 3D imaging of an object based on light triangulation.

BACKGROUND

Industrial vision cameras and systems for factory and logistic automation may be based on three-dimensional (3D) machine vision, where 3D-images of a scene and/or object are captured. By 3D-images is referred to images that comprise also "height", or "depth", information and not, or at least not only, information, e.g. intensity and/or color, regarding pixels in only two-dimensions (2D) as in a conventional image. That is, each pixel of the image may comprise information associated with the position of the pixel and that maps to a position of what has been imaged, e.g. the object. Processing may then be applied to extract information on characteristics of the object from the 3D images, i.e. 3D-characteristics of the object, and e.g. convert to various 3D image formats. Such information on height may be referred to as range data, where range data thus may correspond to data from height measurement of the object being imaged, or in other words from range or distance measurements of the object. Alternatively or additionally the pixel may comprise information on e.g. material properties such as relating to the scattering of the light in the imaged area or the reflection of a specific wavelength of light.

Hence, a pixel value may e.g. relate to intensity of the pixel and/or to range data and/or to material properties.

Line scan image data results when image data of an image is scanned or provided one line at a time, e.g. by camera with a sensor configured to sense and provide image data, one line of pixels at a time. A special case of line scan image is image data provided by so called "sheet of light", e.g. laser-line, 3D triangulation. Laser is often preferred but also other light sources able to provide the "sheet of light" can be used, e.g. light sources able to provide light that stays focused and do not spread out to much, or in other words, light that is "structured", for example light provided by a laser or Light Emitting Diode (LED).

3D machine vision systems are often based on such sheet of light triangulation. In such a system there is a light source illuminating the object with a specific light pattern, such as the sheet of light as the specific light pattern, e.g. resulting in a light, or laser, line on the object and along which line 3D characteristics of the object can be captured, corresponding to a profile of the object. By scanning the object with such a line, i.e. performing a line scan, involving movement of the line and/or object, 3D characteristics of the whole object can be captured, corresponding to multiple profiles.

3D machine vision systems or devices that use a sheet of light for triangulation may be referred to as systems or devices for 3D imaging based on light, or sheet of light, triangulation, or simply laser triangulation when laser light is used.

Typically, to produce a 3D-image based on light triangulation, reflected light from an object to be imaged is captured by an image sensor of a camera and intensity peaks are detected in the image data. The peaks occur at positions corresponding to locations on the imaged object with the incident light, e.g. corresponding to a laser line, that was reflected from the object. The position in the image of a detected peak will map to a position on the object from where the light resulting in the peak was reflected.

A laser triangulating camera system, i.e. an imaging system based on light triangulation, projects a laser line onto an object to create height profiles from the surface of the target object. By moving the object relative to the cameras and light sources involved, information on height profiles from different parts of the object can be captured by images and then combined and used with knowledge of relevant geometries of the system to produce a three dimensional representation of the object, i.e. 3D image data is provided. This technique may be described as grabbing of images of the light, typically a laser line, when it is projected onto and reflected by the object and then in the images extract positions of the reflected laser line. This is normally accomplished by identifying positions of intensity peaks in the image frames e.g. using a conventional peak finding algorithm. Typically but not necessary the imaging system is setup so that intensity peaks relating to reflected light should occur and be expected per column of the sensor and the position within the column maps to a height or depth.

Peak finding algorithms typically operate in the digital domain and the aim is to find a center position of the peak's light distribution and at sub-pixel resolution. This means that an image with the intensity peaks, involving analogue pixel values corresponding to light sensed by sensor elements corresponding to pixels of the image sensor, first must be read out from the image sensor and be analogue-to-digital (A/D) converted. Conventionally pixel values in the same row are read out at the same time from an image sensor, i.e. parallel readout of pixels in the same row, which thereafter are A/D converted in parallel and then stored and/or processed digitally. When pixels of a row have been readout, readout of pixels of another, e.g. next, row is performed, etc. That is, there is parallel readout of pixels in the same row and such pixel rows are readout and A/D converted sequentially, i.e. serially.

It is in general desirable to remove or reduce delays to thereby facilitate or enable higher throughput from a 3D imaging system, e.g. how fast a 3D imaging system based on light triangulation can provide 3D images of objects, and/or to be able to, or better support, high, or higher, speed applications.

US 2021/0006738 A1 discloses a solution with a first read-out step performed by reading-out fast, with low accuracy, using a separate fast-readout channel an entire pixel array, corresponding to an entire image from the image sensor. The read-out image is thereafter used to calculate position of a ROI for the image. The position of the ROI is then fed back to the image pixel array of the image sensor to mark pixels that, in a second read-out step, are read-out as another image. The second read-out step involve reading-out pixels of the ROI with full accuracy, using another, slower, readout channel, and thus fewer pixels need to be read out over that channel.

SUMMARY

In view of the above, an object of the invention is to provide one or more improvements or alternatives to the prior art, such as to reduce delays involved in operation of 3D imaging systems and/or image sensors, in particular such based on, or for, 3D imaging based on laser triangulation.

According to a first aspect of embodiments herein, the object is achieved by a method, performed by one or more devices, i.e. device(s), for provision of pixel values for readout from at least a region of pixels of an image sensor. The device(s) obtains information indicating a threshold pixel value and a window at, or around, maximum, WAM, width corresponding to a number of pixels. The device(s) exposes pixels of at least said region of the image sensor, whereby the exposed pixels attain analogue pixel values, respectively, corresponding to sensed light during the exposure. The device(s) identifies a respective pixel group of one or more pixels in respective image sensor column of said region whose analogue pixel value during said exposure was first in said respective column to reach or pass said threshold pixel value. Furthermore, the device(s) associates said identified respective pixel group with a respective certain WAM position of a respective WAM in said respective image sensor column of said region and which respective WAM has said WAM width, whereby the respective WAM in respective column identifies a number of pixels corresponding to the WAM width covering the identified respective pixel group and neighboring pixels. Moreover, the device(s) provides, for parallel readout per WAM position and based on said exposure, pixel values of pixels associated with the same WAM position in their respective WAM.

According to a second aspect of embodiments herein, the object is achieved by one or more devices, i.e. device(s), for provision of pixel values for readout from at least a region of pixels of an image sensor. The device(s) is configured to obtain information indicating a threshold pixel value and a WAM width corresponding to a number of pixels. The device(s) is configured to expose pixels of at least said region of the image sensor, whereby the exposed pixels attain analogue pixel values, respectively, corresponding to sensed light during the exposure. The device(s) is configured to identify a respective pixel group of one or more pixels in respective image sensor column of said region whose analogue pixel value during said exposure was first in said respective column to reach or pass said threshold pixel value. Further, the device(s) is configured to associate said identified respective pixel group with a respective certain WAM position of a respective WAM in said respective image sensor column of said region and which respective WAM has said WAM width, whereby the respective WAM in respective column identifies a number of pixels corresponding to the WAM width covering the identified respective pixel group and neighboring pixels. Moreover, the device(s) is configured to provide, for parallel readout per WAM position and based on said exposure, pixel values of pixels associated with the same WAM position in their respective WAM.

According to a third aspect of embodiments herein, the object is achieved by a computer program comprising instructions that when executed by one or more devices causes these to perform the method according to the first aspect; and/or instructions that when executed by a hardware synthesizing device causes hardware to be synthesized and/or be configured as said one or more devices according to the second aspect.

According to a fourth aspect of embodiments herein, the object is achieved by a carrier comprising the computer program according to the third aspect.

According to a fifth aspect of embodiments herein, the object is achieved by an imaging system comprising the one or more devices according to the second aspect and a light source configured to illuminate an object with a specific pattern of light and wherein the light source and the image sensor are arranged in relation to each other in the imaging system so that the specific pattern of light, when reflected by the object, at least partly becomes incident light on the image sensor when said pixels are exposed. As a result, said pixel values for readout comprise information convertible to information on three dimensional characteristics of the object regarding positions on the object that reflected the light and caused said incident light on the image sensor.

In embodiments herein, the pixel position in, and relative to, respective WAM thus determines which pixels are provided in parallel for the readout, not the actual image sensor row position as conventionally is the case. In other words, readout is here relative to the position in respective WAM and not the actual row position. This way there is no need to readout pixels of all rows of the region or the image sensor, or of all rows required to cover WAMs of all columns. The number of readouts needed to be performed to get relevant pixel values, i.e. image data, covering all WAMs can thus be reduced compared to how this conventionally is handled. Faster readout and faster performance is thus enabled. It is realized that the method is of particular interest to implement for applications involving the image sensor where readout from around light intensity maxima is of interest. This is for example the case when the image sensor is used as image sensor in light, e.g. laser, triangulation, such as in 3D imaging based on light triangulation, or in other words when for example the image sensor is used as image sensor of a camera of a 3D imaging system based on light triangulation.

BRIEF DESCRIPTION OF THE DRAWINGS

Examples of embodiments herein are described in more detail with reference to the appended schematic drawings, which are briefly described in the following.

FIG. 1 schematically illustrates an example of a prior art 3D imaging system based on light triangulation, and that some embodiments herein can be used with.

DETAILED DESCRIPTION

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

Figure 1:
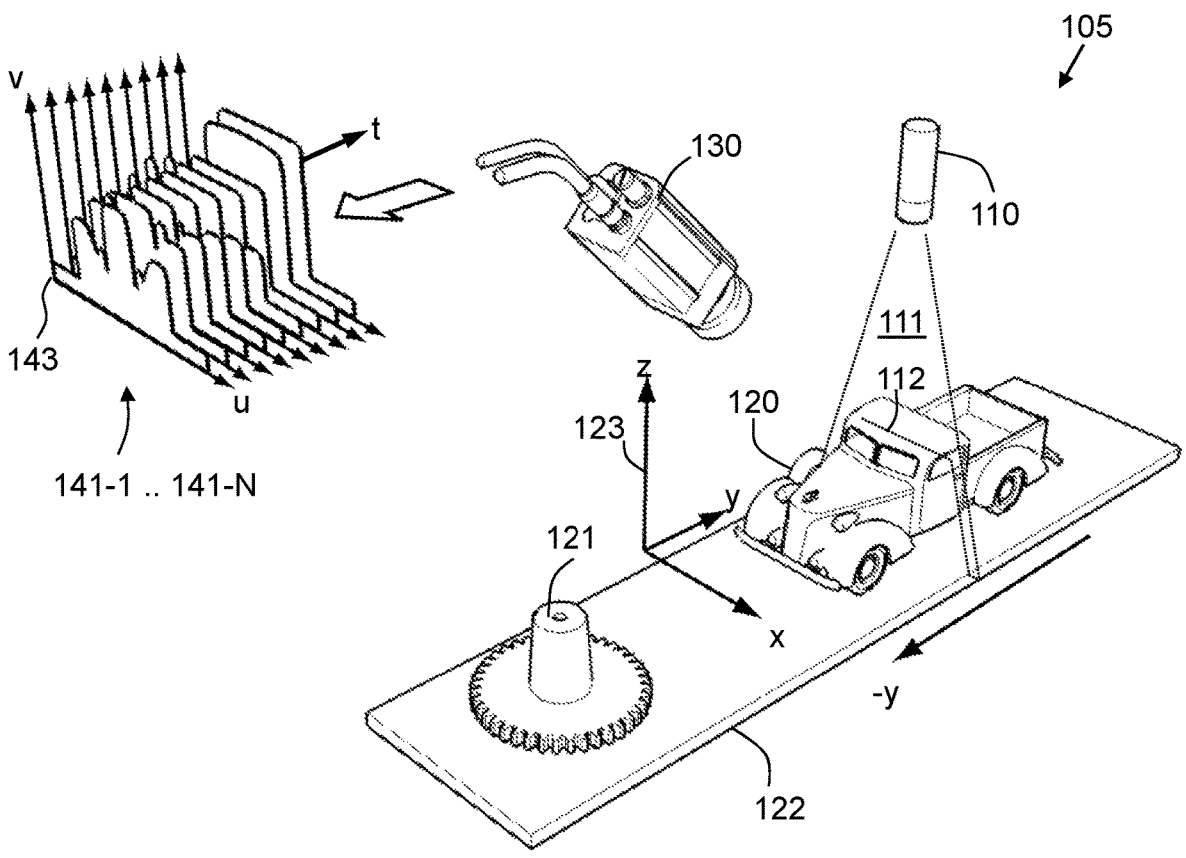

FIG. 1 schematically illustrates an example of such type of imaging system as mentioned in the Background, namely an imaging system 105, for 3D machine vision, or simply 3D imaging, based on light triangulation, i.e. imaging for capturing information on 3D characteristics of measure objects. The system 105 is in the figure shown in a situation of normal operation, i.e. typically after calibration has been performed and the system is thus calibrated. The system 105 is configured to perform light triangulation, here in the form of sheet of light triangulation as mentioned in the Background. The system 105 further comprises a light source 110, e.g. a laser, for illuminating measure objects to be imaged with a specific light pattern 111, in the figure exemplified and illustrated as a sheet of light. The light may, but not need to be, laser light. In the shown example, the target objects are exemplified by a first measure object 120 in the form of a car and a second measure object 121 in the form of a gear wheel construction. When the specific light pattern 111 is incident on an object, this corresponds to a projection of the specific light pattern 111 on the object, which may be viewed upon as the specific light pattern 111 intersects the object. For example, in the shown example, the specific light pattern 111 exemplified as the sheet of light, results in a light line 112 on the first measure object 120. The specific light pattern 111 is reflected by the object, more specifically by portions of the object at the intersection, i.e. at the light line 112 in the shown example. The system 105 further comprises a camera 130 comprising an image sensor (not shown in FIG. 1). the camera and image sensor are arranged in relation to the light source 110 and the objects to be imaged so that the specific light pattern, when reflected by the objects, become incident light on the image sensor. The image sensor is an arrangement, typically implemented as a chip, for converting incident light to image data. Said portions of the object, which by reflection causes said incident light on the image sensor, may thereby be captured by the camera 130 and the image sensor, and corresponding image data may be produced and provided for further use. For example, in the shown example, the specific light pattern 111 will at the light line 112 on a portion of the car roof of the first measure object 120 be reflected towards the camera 130 and image sensor, which thereby may produce and provide image data with information about said portion of the car roof. With knowledge of the setup, including the geometry, of the system 105, e.g. how image sensor coordinates relate to real world coordinates, such as coordinates of a coordinate system 123, e.g. Cartesian, relevant for the object being imaged and its context, the image data may be converted to information on 3D characteristics, e.g. a 3D shape or profile, of the object being imaged in a suitable format. The information on said 3D characteristics, e.g. said 3D shape(s) or profile(s), may comprise data describing 3D characteristics in any suitable format.

By moving e.g. the light source 110 and/or the object to be imaged, such as the first measure object 120 or the second object 121, so that multiple portions of the object are illuminated and cause reflected light upon the image sensor, in practice typically by scanning the objects, image data describing a more complete 3D shape of the object may be produced, e.g. corresponding to multiple, consecutive, profiles of the object, such as the shown profile images 141-1-141-N of the first measure object 120, where each profile image shows a contour of the first object 120 where the specific light pattern 111 was reflected when the image sensor of the camera unit 130 sensed the light resulting in the profile image. As indicated in the figure, a conveyor belt 122 or similar may be used to move the objects through the specific light pattern 112, with the light source 110 and the camera unit 130 typically stationary, or the specific light pattern 111 and/or the camera 130 may be moved over the object, so that all portions of the object, or at least all portions facing the light source 110, are illuminated and the camera can receive light reflected from different parts of the object desirable to image.

As understood from the above, an image frame provided by the camera 130 and its image sensor, e.g. of the first measure object 120, may result in any one of the profile images 141-1-141-N. As mentioned in the Background, each position of the contour of the first object shown in any of the profile images 141-1-141-N are typically determined based on identification of intensity peaks in image data captured by the image sensor and on finding the positions of these intensity peaks, e.g. by means of one or more intensity peak finding algorithms. The system 105 and conventional peak finding algorithms are typically configured to, in each image frame, search for an intensity peak per pixel column. If sensor coordinates are u, v, u, as indicted in the figure, may be along image sensor rows and be used to indicate a position in such row, e.g. corresponding to an image sensor column. Correspondingly, v may be along image sensor columns and be used to indicate a position in such column, e.g. corresponding to an image sensor row.

For each position u of an image frame it may be searched for a peak position along v, e.g. by means of a peak finding algorithm as mentioned above, and the identified peaks in an image frame may result in one the profile images 141-1-141-N as shown in the figure. The profile images are formed by image points in a sensor based coordinate system 143, u, v, t. The total of image frames and profile images can be used to create a 3D image of the first object 120.

As a development towards embodiments herein, the situation indicated in the Background will first be further elaborated upon.

At the point of readout of pixel values from the image sensor, the location of the intensity peaks on image sensor area are unknown. To be sure that the intensity peaks are captured a full image, i.e. involving all rows and columns of the image sensor, may need to be read out and the readout pixel values be A/D converted. An option to this may be partial readout when the image sensor supports such readout, but would typically require that it is known that intensity peaks can only occur on a predetermined portion of the full image sensor area, e.g. a partial area corresponding to a region of interest (ROI) of the image sensor, even though it is, as mentioned, not known exactly where in the ROI the peaks occur. Such partial area can be predetermined based on knowledge of the imaging system, setup and/or objects to be imaged. However, even partial readout typically means that a substantial total number of image sensor rows have to be read out to be sure to capture all positions in columns where intensity peaks can occur.

The time to be able provide a profile image as mentioned above based on identified intensity peak locations may be greatly influenced by, even be proportional, to, the height of the measurement region, i.e. the region where the intensity peaks can occur, corresponding to a number of rows used on the image sensor. Hence, performance of a 3D imaging system based on light triangulation can be substantially limited by delays resulting from this readout. A solution with reduced readout related delay would facilitate and/or enable higher throughput from the 3D imaging system and support high speed applications. Note that if time could be saved it may not only be of interest to increase throughput as such, the time can also be used to e.g. perform multiple exposures with different exposure time to e.g. increase the dynamic range of the imaging.

For a peak finding algorithm to be able to identify the positions of the intensity peaks, image data in pixels with at least some margin around location of the intensity peaks have to be available, e.g. to allow the peak finding algorithm to find a center position of light distribution at sub-pixel resolution. The margin should substantially cover the light distribution around the intensity peaks.

If there e.g. is a row of the image sensor for which it is known that no intensity peaks occur above and another row for which it is known that no intensity peaks occur below, it could be sufficient to read out only rows between such top and bottom rows, preferably with said margin so that light distribution is captured also for peaks at said "border" rows. When the image sensor has been exposed and the pixels contain pixel values for readout, corresponding to an image, the image sensor could thus be provided with functionality, e.g. based on a threshold, for identifying the highest and lowest rows with a pixel associated with an intensity peak. This would provide some flexibility compared to having to predetermine a portion for readout, but still all rows between the "highest" and "lowest" row with intensity values would need to be read out. If the intensity values would be located along in line, and/or with small variations, along a single row, this would result in small or even minimum number of rows needed to be read out. However, in case of greater height or depth variations captured by an image, and thus greater dynamic range in this regard, i.e. with intensity values over a large number of rows, the intensity peaks will cover a great number of rows that thus also need to be readout. Such variations cannot as such be avoided since the variations are fundamental for capturing height and depth information about the object.

Figures 2A, 2B, 2C:
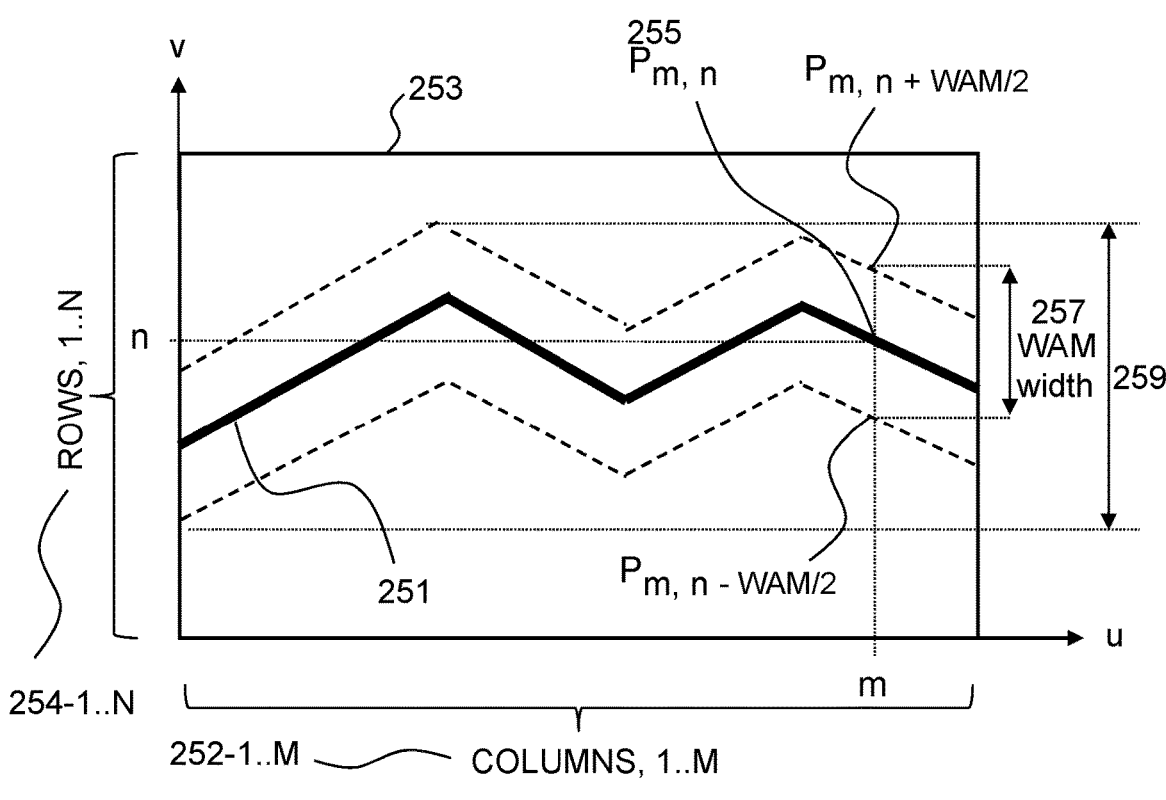
FIG. 2A schematically shows an example of an image resulting from exposure of an image sensor FIG. 2B schematically shows a light distribution as example of how light distribution around an intensity peak may look like FIG. 2C schematically shows an example of a window at, or around, maximum (WAM) FIG. 3A schematically shows an example of an intensity line on pixels of an image sensor.

FIG. 2A schematically shows an example of an image resulting from exposure of an image sensor, where location of highest intensity pixels in each column are shown as an intensity line 251 corresponding to captured reflected light from an object when the object has been illuminated by a light line during light triangulation, e.g. as described above in relation to FIG. 1. The image is an image in sensor coordinates u, v, with a number N pixel rows 1 . . . N, corresponding to image sensor rows 254-1 . . . 254-N, and a number M of pixel columns 1 . . . M, corresponding to image sensor columns 252-1 . . . 252-M.

A window at, or around, maximum (WAM) is a window covering and/or around an intensity peak center so that the WAM covers the center with some margin, preferably so that that the light distribution around the intensity peak is substantially and/or sufficiently covered. What is sufficient may follow from what is required by a peak finding algorithm to be used and how much of the light distribution is required, or preferred, for the algorithm to be able to output a center position with desirable sub-pixel accuracy, and to be used to represent the position of the intensity peak.

FIG. 2B schematically shows a light distribution 261 as example of how light distribution around an intensity peak may look like along axis v in the example, i.e. along a column. The actual values available are discrete, per pixel, and has been drawn out as black squares in the figure. The shown example relates to light distribution along a column m around a highest intensity pixel $P_{m,n}$ of the intensity line 251, corresponding to a pixel position 255 in the figure. An actual center position 263, e.g. in sub pixel resolution, of the light distribution is for determination by e.g. a peak finding algorithm after A/D conversion and is not known to begin with. Note that the center position is typically, and in the example, offset from the location of the pixel with the highest intensity in the column, i.e. the pixel position 255 and pixel $P_{m,n}$ in the example. It would thus be desirable with a WAM having a WAM width 257 that sufficiently covers the light distribution 261 so that the peak finding algorithm can exploit the light distribution 261 to find the actual center position 263. As mentioned, the WAM width to accomplish this can be predetermined and/or preconfigured based on the peak finding algorithm to be used and e.g. requirements on accuracy. In practice a WAM width that covers about 75% or more of the energy in the intensity peak may be sufficient, and for a typical sensor and setup a typical WAM width may be in a range 7-25 pixels. However, lower than 75% and less than 7, or more than 25, can of course also be used with embodiments herein.

FIG. 2C schematically shows an example of a WAM 258 in general having a WAM width 257. In the example the WAM is shown around the pixel $P_{m,n}$ at pixel position 255, extending along column m and centered around row n. A WAM, as in the case of the WAM 258, is preferably a pixel window, i.e. a window corresponding to an integer number of pixels, to be symmetrically centered around a pixel, for example centered around the highest intensity pixel $P_{m,n}$ at pixel position 255. However, a WAM can of course instead have some offset to such pixel and/or not be completely symmetrical around a center pixel of the WAM, such as if the WAM consists of an even number of pixels instead of odd as in the shown example.

As seen in FIG. 2A, a respective WAM, as described above, around each highest intensity pixel of the intensity line 251, results in a margin above and below the intensity line 251 corresponding to the dotted lines shown above and below the intensity line 251 in FIG. 2A.

Hence, as already indicated above, for readout of pixel rows involved in all WAMs, i.e. all rows with captured light to be processed by the peak finding algorithm, a number of rows corresponding to a total width 259 that is much larger than the WAM width 257 is typically needed. Reason for this is, as mentioned above and clarified by the shown example, that the intensity line vary over the columns. Such variation is fundamental since it captures height and depth information about the object and is thus, as such, not desirable to remove or avoid. However, at the same time it means that if not for all, but at least for a large number of images, all or a very large number of rows have to be read out from the image sensor. Still, in each column, it would suffice to read out pixels of the WAM since they contain the actual information of interest, i.e. information regarding the light distribution.

Embodiments herein are based on the idea of only reading out pixels within WAMs, thereby heavily reducing the number of readouts else typically needed to be performed. As a result it is enabled and facilitated increased throughput and high speed applications, in particular for 3D imaging based on light triangulation.

In the following it is shown and discussed how this can be done according to various embodiments of a method, and it is also shown examples of how the method can be implemented in hardware.

FIGS. 3A-F will now be used to explain embodiments herein based on the concept of WAMs and parallel readout of pixels within WAMs having the same WAM position, i.e. that are in what can be considered the same WAM row, instead of parallel readout of pixels that are in the same image sensor pixel row, which is the conventional way pixels are read out.

Figure 3A:
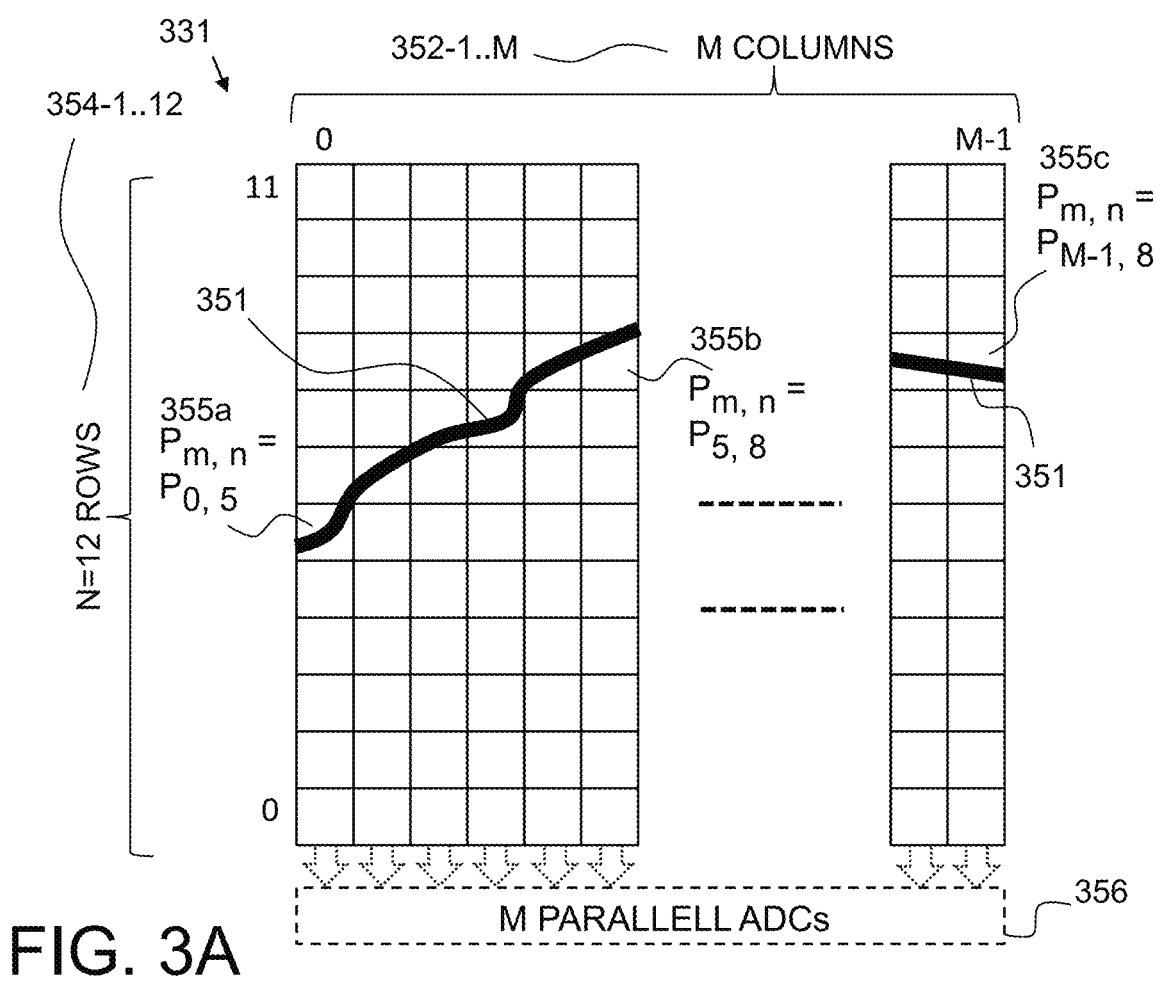
FIG. 3B schematically shows an example of which pixel in each column of FIG. 3A that during exposure first is detected to be above a threshold pixel value-FIG. 3C schematically shows a WAM with a 5 pixel WAM width for use in column m.
FIG. 3D schematically shows example when WAMs as in FIG. 3C are applied around pixels detected as in FIG. 3B.
FIG. 3E schematically shows that pixels having the same WAM position are readout in parallel and that such parallel readouts for different WAM positions are performed sequentially.
FIG. 3F schematically shows pixels of the example that are part of the first same WAM position, corresponding to pixels of a first WAM row for parallel readout, here with indexes m, n for column, row being used for identifying pixels P.

FIG. 3A schematically shows an example of an intensity line 351 on pixels of an image sensor 331, where the individual pixels are shown as squares. The pixels corresponding to light sensing elements and may be of a conventional type. There are a number N=12 pixel rows 0 . . . 11, corresponding to image sensor rows 354-1 . . . 354-12, and a number M of pixel columns 1 . . . M, corresponding to image sensor columns 352-1 . . . 352-M.

The example shows a typical situation where pixel values are read out one at a time per column, and conventionally this is a pixel row of the image sensor per time, i.e. the pixel values of a row are read out in parallel and then analogue-to-digital (A/D) converted, i.e. as indicated in the figure, the M columns may be connected to M A/D converters 356 configured to operate in parallel.

Note that the shown intensity line 351 here is just to show where the actual intensity peaks may be located although the pixels of course cannot sense the line with the resolution it is shown with. The intensity line may be reflected light from an object when the object has been illuminated by a light line during light triangulation, e.g. as described above in relation to FIG. 1.

Just to use as specific examples, some pixels are individually marked out. For example a pixel 355a is a pixel P in column m=0, row n=5 and may thus be referred to as pixel $P_{m,n}=P_{0,5}$. A pixel 355b is pixel $P_{m,n}=P_{5,8}$ and a pixel 355c is $P_{m,n}=P_{M-1,8}$.

All these are also examples of the pixel in their respective column where a major part of the intensity line 351 is located in that column.

A problem with the idea of reducing the number of rows to read out, as explained above in connection with FIG. 2, is that before the readout, it is not known nor trivial to know where the intensity peaks are or will be located. The location of the intensity line 351 is not known and peak finding algorithms operate in the digital domain after readout. What would be desirable is a way to roughly identify peak center, e.g. in normal pixel resolution, to be able to apply WAM around it. Something that makes it even more complicated is that not only one pixel per column will actually sense light, but several pixels, so it is not sufficient to just identify a pixel with sensed light, but the pixel per column that has sensed the most light.

A solution to this, that embodiments herein are based on, may be referred to as a "winner takes all" type of solution. Instead of waiting after the exposure, it is checked during exposure which pixel in respective column that first reaches or passes a threshold pixel value, which means this pixel is the "winner" in that column, and will be the pixel subject to WAM, e.g. be the center position for the WAM in that column or at least be covered by the WAM of that column. First reaching or passing the threshold in a column indicates that this pixel was first to be sufficiently intense, i.e. first to sense a certain amount of light. This idea utilizes the assumption that during the exposure the pixel exposed to the most intense light in a column will also be first to reach or pass the threshold. For example, in the shown example pixels 355a-c are example of the pixels in their respective column that will be first to pass such threshold value.

An assumption is that the light pattern on the image sensor, e.g. the intensity line 351, during the exposure is substantially still and thus not move over several pixels. If there is some movement it shall be so small that it has no practical negative impact. This will be typically no problem in practice since if substantial movement would be the case, the images would be blurry, and in principle for all imaging, at least for machine vision and industrial applications, and in particular in the case of 3D imaging based of light triangulation, everything is configured and operating to provide sharp and not blurry images, i.e. there is no or very little change in position of the light pattern during the exposure.

The threshold should be set so that all actual intensity peaks of interest to be able to identify in a column, at least one pixel will reach or pass the threshold value. At the same time it may be desirable not to use a too low threshold since other light and noise can occur and make other, "wrong", pixels register some light sooner. It is within the capacity of the skilled person, e.g. through routine testing and experimentation with the image sensor, imaging system, and the setup thereof, to find a suitable threshold value to use.

Figure 3B:
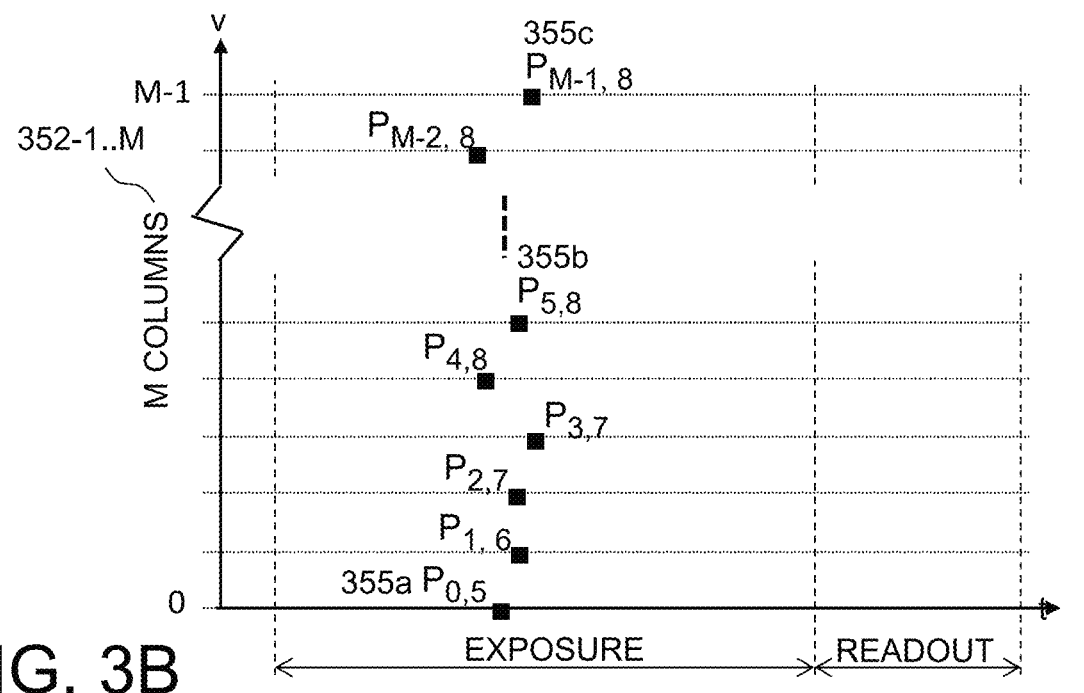

FIG. 3B schematically shows an example of respective pixel in respective column of FIG. 3A that during exposure first reached or passed a common threshold pixel value as mentioned in the preceding paragraph. Said example pixels 355a-c are marked out as these are examples of such "winner" pixels. It can be realized from FIG. 3A that the "winner" in each column is the single pixel that during the exposure receives, or "sees", the most light, e.g. the one that receives the most intensity, which in the example is determined by where the intensity line 351 in that column is located.

Hence, by utilizing thresholding during exposure, it can be identified which pixel in each column that should be covered by the WAM and preferably be the WAM center pixel. Using a threshold to identify which pixel in a pixel column of an image sensor that is first to reach or pass a threshold value can, as realized by the skilled person, be accomplished in several different ways. A specific example is shown separately below.

The row number, or row address, for the identified pixel in respective column, may be stored, e.g. one such row identifier per column with identified pixel. Identifying the row of the identified pixel in each column is sufficient to identity the pixel. Reason for storing the number is e.g. to be able to later associate, or map, position of a WAM to actual sensor row positions, as explained further below, and thereby e.g. be able to know the actual position on the sensor for an intensity peak position found by the peak finding algorithm.

Figure 3C:
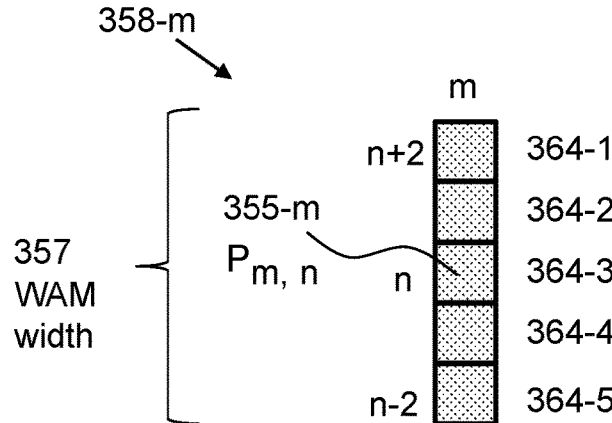

FIG. 3C schematically shows a WAM 358-*m*, where m may be any m=0 . . . M−1 and has a pixel WAM width. There is thus 5 WAM positions, or WAM rows, 364-1 . . . 364-5 per WAM, as shown in the figure. The WAM 358-*m* is to cover, preferably be centered around, the pixel in column m identified as the "winner" pixel in that column, i.e. with the pixel value that during the exposure was first in the column to reach or pass the threshold value. In other words, a respective WAM center position may be located on the pixel, in respective column, identified as "winner" pixel as explained above in relation to FIG. 3B. If the "winner" is located at the edge of the image sensor, it is up to and within the capacity of the skilled person to handle this, e.g. based on the circumstances, e.g. application, requirements etc. One solution may be to adapt the WAM in such case so that it starts at the edge pixel and extends therefrom with the WAM width along the column. For such pixels the WAM will not be centered around the winner but will at least cover it as good as it gets and it is then up to e.g. the peak finding algorithm to handle this, e.g. use or reject the image data from such WAM to find the peak position. In some columns there might be no pixel that reaches the threshold, in which case the position of the WAM may be set to a predetermined position, e.g. at one edge of the imager. This way subsequent handling with WAM per column, read out etc. can be consistent. In this case the subsequent processing, e.g. by means of a peak finding algorithm, would in any case not be able to generate a valid peak position since there is no valid peak with enough intensity, and it thus not matter which pixels values are output for that column.

Figure 3D:
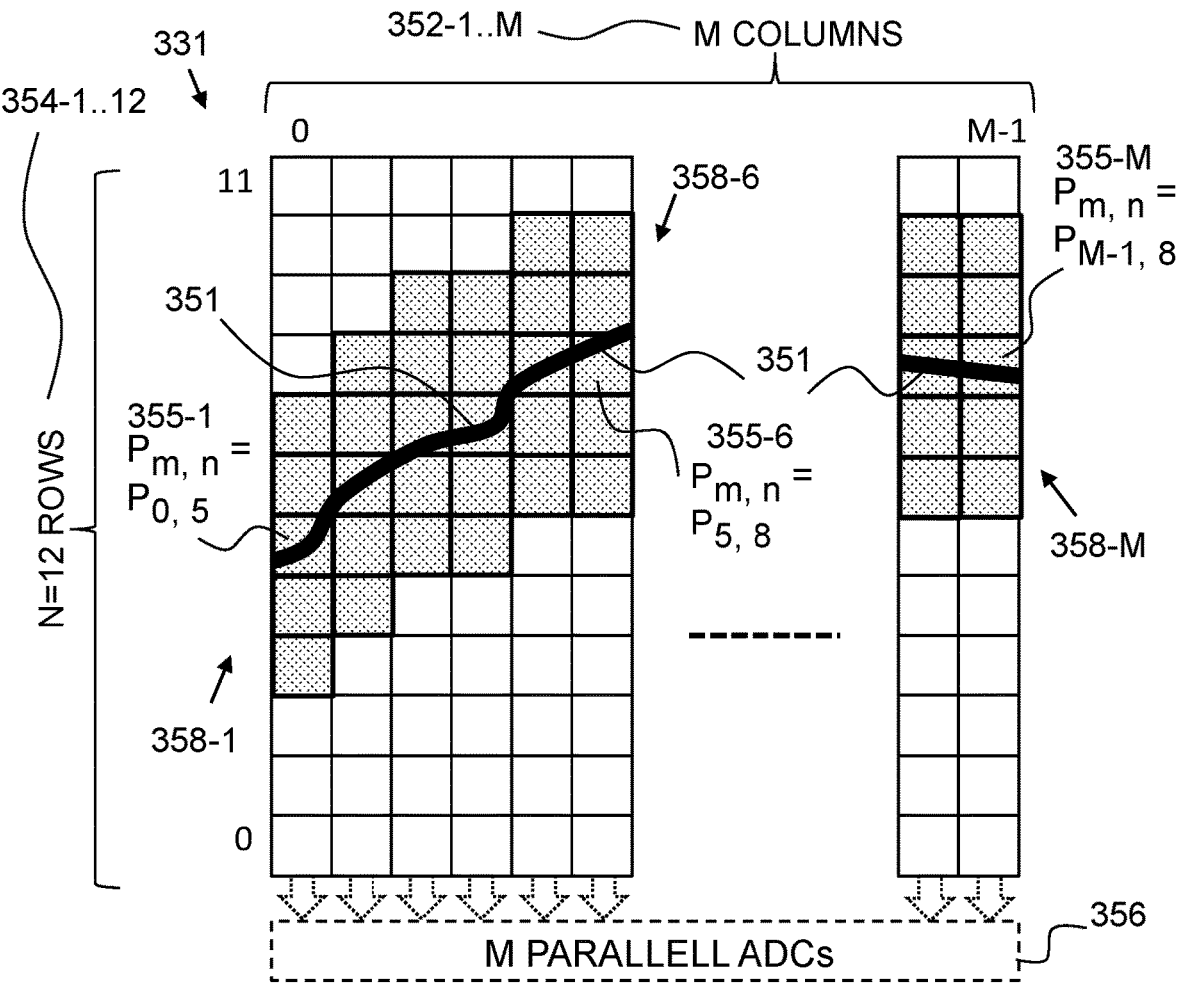

FIG. 3D schematically shows example when WAMs as in FIG. 3C are centered on pixels detected as in FIG. 3B. In other words, the figure shows WAMs, one per column, i.e. a respective WAM 358-*m* for m=1 . . . M., centered on the identified "winner" pixel in respective column m. There is thus one such WAM 358 per column.

Figure 3E:
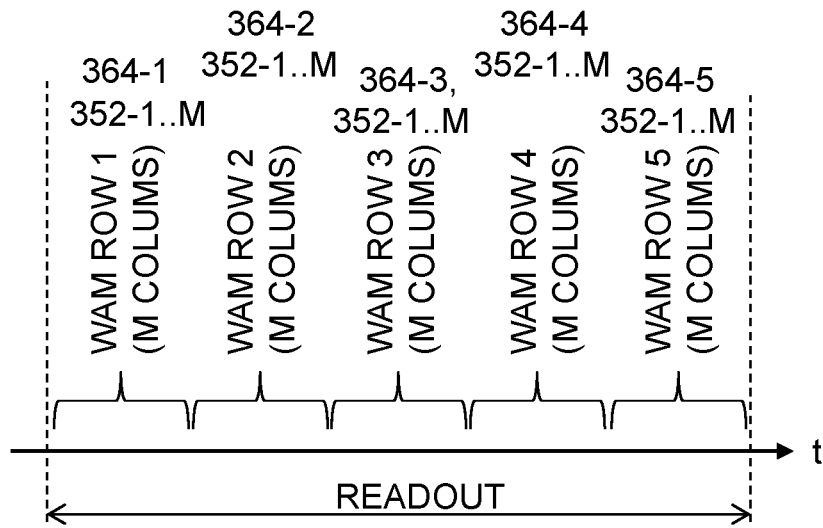

FIG. 3E schematically shows that pixels having the same WAM position are to be readout in parallel and that such parallel readouts for different WAM positions are performed sequentially. For example, since the WAM width in the example is 5 pixels, the readout time here consists of 5 sequential readouts, e.g. a first readout of the same WAM position for the WAMs, thus one and the same WAM position per column. Note that the WAM positions are, and the WAM row is, the same for the pixels that are to be read out in parallel. However the WAM positions although the same need not, as realized form the below, be mapping to the same image sensor row.

In the example, during a first ⅕ of the total readout time all the pixels in respective column covered by the first WAM position, or first WAM row, 364-1 are read out in parallel, etc. This means that, with reference to the example in FIG. 3D, that the pixels at the upmost WAM position, i.e. in the WAM row 364-1, for all columns 352-1 . . . 352-M, are provided for parallel readout and for example be A/D converted by the ADCs 356.

Figure 3F:
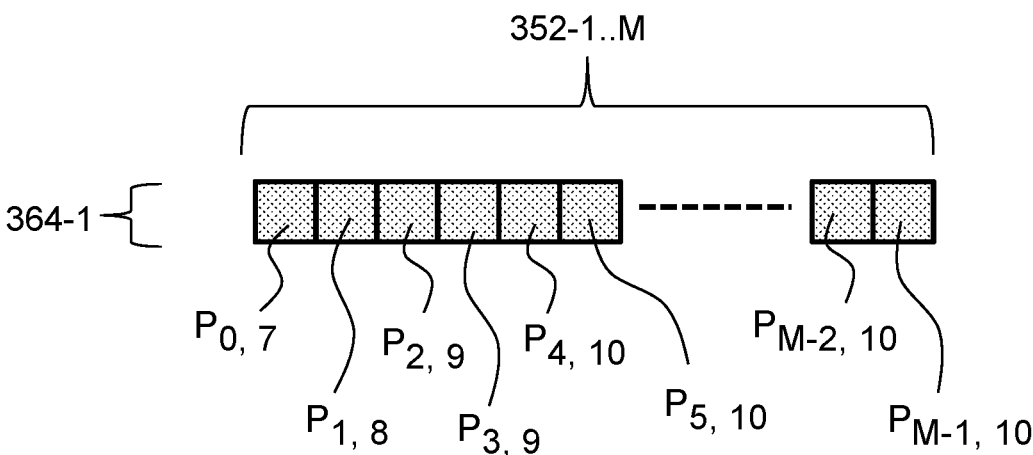

FIG. 3F, just as example, schematically shows pixels of the example that are part of the first same WAM position, i.e. first WAM row 364-1, thus corresponding to pixels of a first WAM row for parallel readout from columns 352-1 . . . 352-M. It is realized from studying FIG. 3D and where the first WAM position of respective WAM is located, that the image sensor pixels in FIG. 3F are the pixels of the first WAM row 356-1.

Embodiments herein, as explained above, thus involve identifying analogue pixel values that during exposure is a "winner", or in other words, is first, in respective column to reach or pass a threshold pixel value. Compared to such prior art solution as mentioned in the Background there is thus no need for a first, fast, low accuracy, full image (pre) read-out from the sensor using a separate fast read-out channel, then process the read-out digital image to find positions for pixels that form a ROI to thereafter be read out with full, normal accuracy in a second read-out step. Looking at analogue pixel values of one or more pixels per column that during exposure is/are first in respective column to reach or pass a threshold pixel value, as in embodiments herein, removes the need for two-step readout of the same pixels from image sensor and removes the need for a separate read-out channel for the first read-out step, as in said prior art. Analogue pixels values first to reach or pass a threshold also means that no more time than sufficient for a pixel or pixel group per column to reach or pass the threshold is needed to identify positions of the WAMs. The total of WAMs may be considered to correspond to the ROI as in said prior art, but thus determined in another way.

Figure 4:
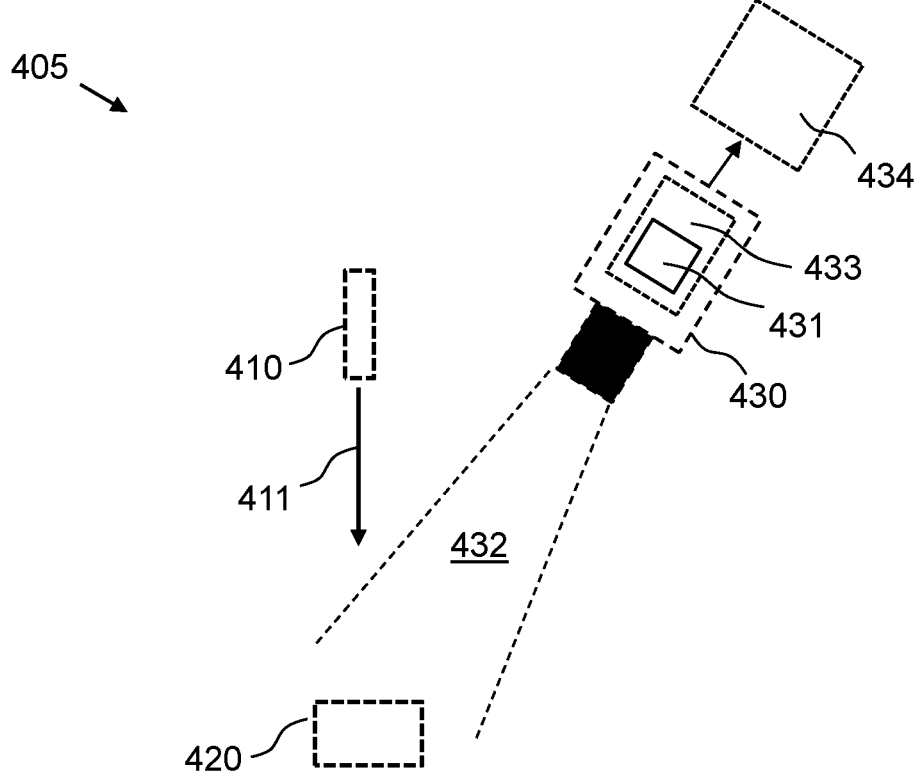
FIG. 4 schematically illustrates an example of an imaging system that embodiments herein can be performed with and/or that fully or partly can be configured to carry out some embodiments.

FIG. 4 schematically illustrates an example of an imaging system 405 that embodiments herein can be performed with, and/or that fully or partly can be configured to perform some embodiments.

What is shown is a simplified imaging system that can be configured to carry out embodiments herein, i.e. is for implementing embodiments herein. The imaging system 405 is based on light triangulation for capturing information on 2D and 3D characteristics of one or more measure object, e.g. a measure object 420 as schematically is shown in the figure. The shown system can be considered to corresponds to a basic configuration and comprises: A light source 410 for illuminating a measure object 420 with light 411, typically laser light, as part of light triangulation for 3D imaging of the measure object 420. A camera 430 with image sensor 431 arranged for sensing reflected light from the measure object 420 as part of said light triangulation for the 3D imaging.

The camera 430, image sensor 431 and light source 410 are configured and positioned in relation to each other for light triangulation. The system 405 may for the light triangulation purpose correspond to the system 105 in FIG. 1, but may additionally be configured to perform with and/or according to embodiments herein as described further below.

Hence: The measure object 420 may correspond to the first measure object 120, or the measure object 220, and is shown located at least partly within field of view 432 of the camera 430. The light source 410 is configured to illuminate the measure object 420 with the light 411, typically in the form of structured light, such as a specific light pattern, for example a sheet of light and/or a light, such as laser, line, that is reflected by the measure object 420 and the reflected first light is captured by the camera 430 and image sensor 431. Another example of structured light that can be used as the first light is a light edge, i.e. an edge of an area or portion with illumination. The illumination is in the example in a vertical direction, i.e. substantially parallel to the z-axis. However, as will be realized from the below, other direction or directions of illumination are of course possible to use with embodiments herein, including, for example, so called "specular" configuration with the light source, e.g. laser, substantially pointing at the measure object with a "specular" incident angle, corresponding to the viewing angle of the camera but from the opposite side.

The measure object 420 may thus be illuminated and images may be captured as in conventional light triangulation. Said light triangulation may thus involve movement of the light source 410 and/or the measure object 420 in relation to each other, so that at different consecutive time instants, different consecutive portions of the measure object 420 are illuminated by the light source 410 and the light 411. Light 411 after reflection from the measure object 420 is sensed by the image sensor 431. In light triangulation, typically, but not necessary, the camera 430 and first light source 410 are fixed in relation to each other and the measure object 420 moves in relation to these. Through said sensing by the image sensor 431, a respective image frame is associated with a respective time instant of when the image frame was sensed, i.e. captured, and with a respective portion of the measure object 420 from which the image sensor 431 sensed reflected first light 411 at the respective time instant.

Image frames and/or information derived from image frames, e.g. intensity peak positions, provided by the camera 430 and the image sensor 431 may be transferred for further processing outside the camera 430, e.g. to a computing device 434, such as a computer or similar. Such further processing may additionally or alternatively be performed by a separate computing unit or device (not shown), e.g. separate from the image sensor 431, but still comprised in, e.g. integrated with, the camera 330, or a unit comprising the camera 430. The computing device 434, e.g. computer, or another device (not shown) may also be configured to control devices involved in the light triangulation, so that the light triangulation and related actions are performed. Moreover, said computing device 434, e.g. computer, or another device (not shown) may be configured to perform and/or be involved in some of the actions described above and/or relating to embodiments herein, as described further below. Moreover, as schematically illustrated in the figure, the image sensor 431, or what may correspond to a conventional image sensor, may be comprised, e.g. integrated, with an image sensing device or circuitry 433 that has further or additional functionality, e.g. circuitry, to perform embodiments herein. A details example of this is discussed separately below. Note that the image sensing circuitry 433 may correspond to an image sensor with further functionality and circuitry than a conventional image sensing circuitry and this together with the image sensor 431 may be named image sensor as well, e.g. when this circuitry and the image sensor are integrated in one and the same device and unit, e.g. chip, and be configured to operate in accordance with embodiments herein. It is also possible with a situation where the image sensor 431 and/or image sensing device 433 could correspond to a conventional image sensor from a hardware point of view, e.g. implemented as a chip, that is configured and/or programmed by software to operate according to embodiments herein.

Figure 5:
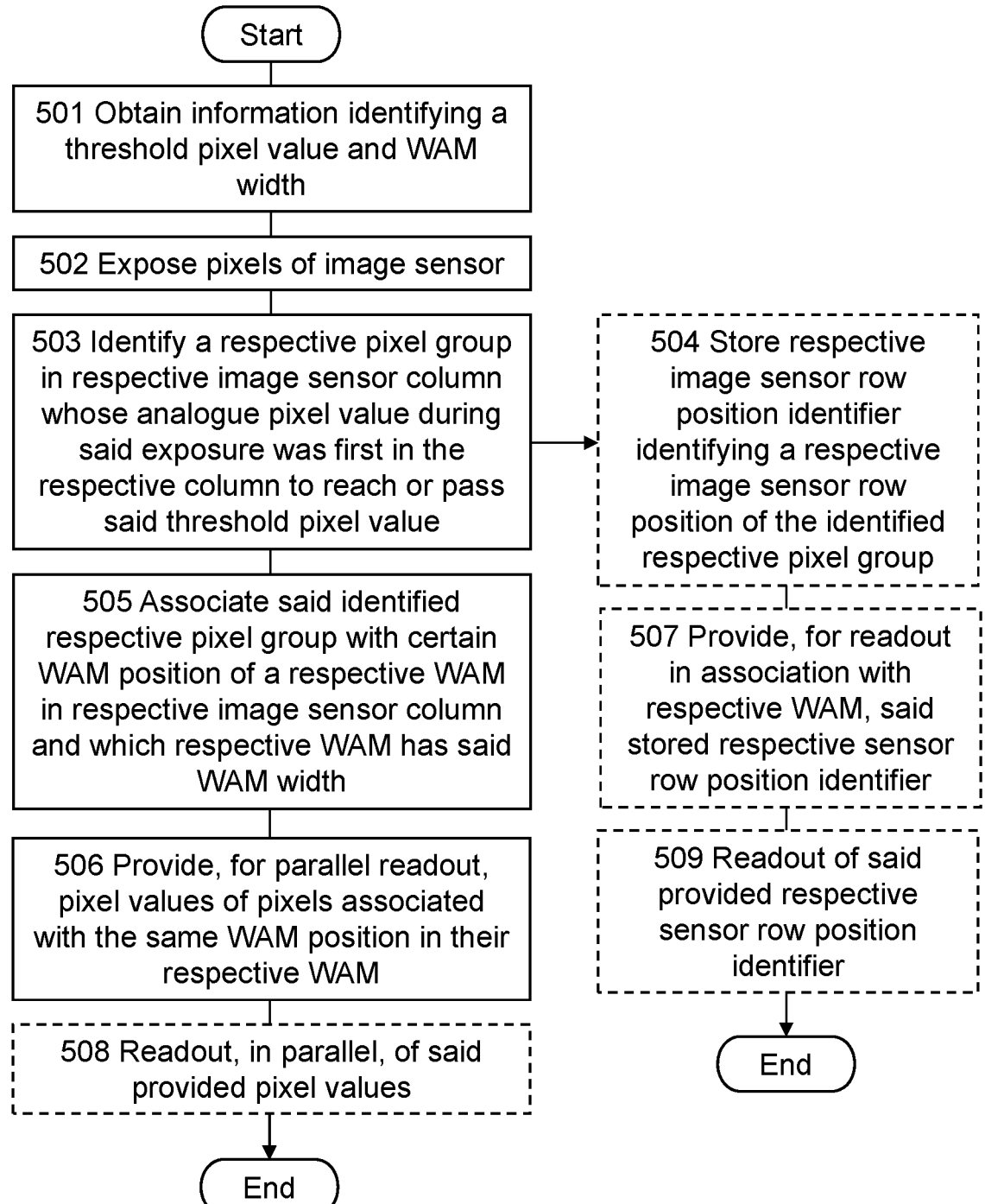
FIG. 5 is a flowchart for schematically illustrating embodiments of a method according to embodiments herein.

FIG. 5 is a flowchart for schematically illustrating embodiments of a method according to embodiments herein. The actions below, which may form the method, are for provision of pixel values for readout from at least a region, e.g. ROI, of pixels of an image sensor.

Regions, or ROI, in this context and as used herein, may in principle correspond to any area or continuous group of pixels of the image sensor 431, e.g. an area comprising a first number of image sensor rows and a second number of image sensor columns, where the first and second number may be the same or different. The region may comprise all or some or some of the image sensor 431 pixels. The special case when the region comprises all pixels of the image sensor 431 is thus corresponding to a normal case without applying an explicit region but an implicit region that is the full image sensor area.

The method and/or actions below and indicated in FIG. 5 may be performed by device(s), i.e. one or more devices, such as the image sensing device 433, the camera 430, and/or the computing device 434, and/or by the imaging system 405 and/or other suitable device(s). Device(s) for performing the method and actions thereof are further described below. To simplify explanation of the method, the method and actions may in the following be exemplified as being carried out by the image sensing device 433.

Note that the actions below may be taken in any suitable order and/or be carried out fully or partly overlapping in time when this is possible and suitable.

Action 501

The image sensing device 433 obtains information indicating a threshold pixel value and a window at, or around, maximum, i.e. WAM, width corresponding to a number of pixels. The WAM width may correspond to the WAM width 257 or 357 as in the examples above. In the following the WAM width 357 will be used as example.

The information may be obtained by being received externally, e.g. via a setting and/or preconfigured value provided to an input of the device(s) performing the action, or the information may be obtained internally by the device (s), e.g. after having been programmed and/or stored in memory of the device(s). In some embodiments the information is predetermined or predefined. The WAM width and the threshold pixel value may correspond to such WAM width and threshold pixel values as in various examples herein.

Action 502

The image sensing device 433 exposes pixels of at least said region of the image sensor 431, i.e., expose them to light, e.g. as part of light triangulation, whereby the exposed pixels attain analogue pixel values, respectively, corresponding to sensed light during the exposure.

In some embodiments, the pixels are during the exposure exposed to light reflected from an object, e.g. the object 420, as part 3D imaging of the object 420 based on light triangulation. That is, embodiments herein applied in the context of light triangulation as mentioned above and e.g. discussed in relation to FIG. 4. The 3D imaging may thus be performed by a 3D imaging system, e.g. the 3D imaging system 405, comprising the device(s), e.g. the image sensing device 433, performing the method and a light source, e.g. the light source 410, configured to illuminate the object with a specific light pattern, e.g. laser light, such as a light or laser line, that may correspond to the light 411. In the 3D imaging system, since it is based on light triangulation, the light source and the image sensor are thus arranged in relation to each other so that the specific light pattern, when reflected by the object, at least partly becomes incident light on the image sensor, e.g. the image sensor 431, or at least on said region of the image sensor, so that the result is said pixel values during the exposure. In these embodiments, the pixel values for readout comprise information convertible to information on three dimensional characteristics of the object, e.g. the object 420, regarding positions on the object, which positions reflected the light, e.g. the light 411, and caused said incident light on the image sensor.

Action 503

The image sensing device 433 identifies a respective pixel group of one or more pixels in respective image sensor column, e.g. respective one of columns 252-1 . . . M or 352-1 . . . M, of said region whose analogue pixel value during said exposure was first in said respective column to reach or pass said threshold pixel value. The group may thus in some embodiments be only a single pixel, corresponding to any one of pixels 255 or 355 in the examples above, but may in some other embodiments be a group of several pixels, which is explained further in a separate example below. In the rest of the text relating to the present figure the respective identified pixel group will be exemplified by a pixel 355, e.g. any one of example pixels 355-*c* above.

Action 504

In some embodiments, the image sensing device 433 stores a respective image sensor row position identifier identifying an image sensor row position, e.g. of any one of the image sensor rows 254-1 . . . N or 354-1 . . . 12, associated with, e.g. of, the identified respective pixel group, e.g. any one of the pixels 255, 355-1 . . . M.

Action 505

The image sensing device 433 associates said identified respective pixel group with a respective certain WAM position of a respective WAM, e.g. respective WAM 358-1 . . . M, in said respective image sensor column of said region, e.g. respective image sensor column 352-1 . . . M. Said respective WAM has said WAM width, e.g. the WAM width 357. As a result, the respective WAM identifies, in the respective column, a number of pixels corresponding to the WAM width covering the identified respective pixel group and neighboring pixels. That is, a WAM in a column covers the identified respective pixel group and some of its neighboring pixels, e.g. pixel groups, in the column to cover also some light distribution associated with the identified respective pixel group.

In some embodiments, the pixels corresponding to the WAM width are located around, i.e. on both sides of, the identified respective pixel group in respective column.

In some embodiments, said respective certain position of the respective WAM that said identified respective pixel group is being associated with, is a respective same, e.g. center, WAM position of the respective WAM.

As used herein, and as should be realized from the examples, WAM position refers to a position of, or in, the WAM as such, i.e. relative to the WAM, independent on which pixels of the image sensor the WAM is associated with. If e.g. the WAM width is 7 pixels or pixel groups, there are 7 different WAM positions. Associating said identified respective pixel group with a respective same WAM position of a respective WAM thus means that there will be one and the same WAM position, for example the first or the center position just to mention some, in respective WAM that the identified respective pixel group is associated with.

As also explained in examples above, the result from said association in Action 505 is that there will be a respective WAM per column covering and/or being around the pixel that, in the column, was identified as first reaching or exceeding said threshold pixel value among the pixels of the column, i.e. the "winner". In each column there will thus be a number of pixels corresponding to the WAM width covering, and/or being around, the identified pixel, i.e. the "winner". The "winner" will thus be associated with, covered by, and/or comprised in the WAM of the column, preferably so that the WAM covers and is located around, i.e. on both sides of, the "winner".

Action 506

The image sensing device 433 provides, for parallel readout per WAM position and based on said exposure, pixel values of pixels associated with the same WAM position, e.g. with the same WAM position or row 364, in their respective WAM, for example pixel values of pixels in the WAM position or row 364-1 of WAMs 358-1 . . . M are provided for parallel readout.

The parallel readout is thus from the involved image sensor columns, i.e. image sensor columns of, or comprised in, said region, for example the image sensor columns 352-1 . . . M.

The WAM position of a pixel in a pixel group of one pixel is thus a position of this pixel within a WAM and relative to the WAM as such, e.g. the pixel in the first, or upmost, position, or row, of the WAM in the column, and may be referred to as the first WAM position or first WAM row. When the group is several pixels, the WAM position of a group may be in the resolution of the group, i.e. the pixel values provided for readout may in this case be a value, e.g. of binned single pixel values, of the group of pixels associated with the same WAM position. Use of pixel groups where each group is two or more pixels and binning is further discussed below.

Note that pixels having the same WAM position, e.g. have the same WAM row position, in different image sensor columns can still be located in different image sensor rows. For example, pixels in the same, such as first, WAM position may belong to two or more different image sensor rows. Such situation was specifically exemplified and discussed above, see e.g. FIG. 3F.

The pixels values provided for readout are thus resulting from the exposure of the image sensor, i.e. in Action 502. In some embodiments, the pixel values, and/or the sensor row positions as in Action 504 are provided for readout as analogue values and may thereafter be A/D converted, as in the examples above. In other embodiments, A/D conversion is first made, e.g. by means of A/D converters per column, resulting in digital pixel values that are provided for readout. In some embodiments, e.g. in case of a Near Sensor Image Processing (NSIP) type of image sensor and image sensor circuitry, there is AD conversion per pixel and digital pixel values are provided from the pixels and for the readout.

In embodiments herein, and as realized from the present action, the group and/or pixel position in, and relative to, respective WAM thus determines which groups and/or pixels are provided in parallel for the readout, not the actual image sensor row position as conventionally is the case. In other words, readout is here relative to the position in respective WAM and not the actual row position. This way there is no need to readout pixels of all rows of the region or the image sensor, or of all rows required to cover WAMs of all columns, in contrast to some prior art solutions as discussed above. The number of readouts needed to be performed to get pixel values, i.e. image data, covering all WAMs can thus be reduced compared to how this conventionally is handled. Faster readout and faster performance is thus enabled. It is further realized that the method may be of particular interest to implement for applications where readout from around light intensity maxima is of interest. This is for example the case when the image sensor is used as image sensor in light, e.g. laser, triangulation, such as in 3D imaging based on light triangulation, or in other words when the image sensor is used as image sensor of a camera of a 3D imaging system based on light triangulation.

Action 507

In embodiments where Action 504 is performed and sensor row positions identifiers are stored, the image sensing device 433 may additionally provide, for readout in association with respective WAM, e.g. respective WAM 358, said stored respective sensor row position identifier associated with the respective WAM. This way the provided analogue pixel values of respective WAM become associated with and can be mapped to image sensor row positions, e.g. any of the image sensor rows 354-1 . . . 12 or 254-1 . . . N, in addition to sensor column positions, e.g. any one of the image sensor columns 352-1 . . . M or 252-1 . . . M, that the WAMs are already associated with.

As realized from Action 503, the stored respective image sensor row position is per respective image sensor column of the region and through Action 505 the identified row position is associated with the respective certain WAM position of the respective WAM, e.g. center position of the respective WAM, and is thus also associated with the respective WAM.

The stored sensor row position identifiers may be in the form of information, e.g. values, identifying the sensor row positions, such as a stored identifier per respective column of the region, or in other words, a row position identifier per WAM and thus per involved column.

Said provision for readout in association with the respective WAM may be provision of one identifier per WAM, e.g. one per involved image sensor column or per image sensor column of the region. The provision may be via a separate output or shared output with the provision of the pixel values for readout, e.g. provision per image sensor column. For example, in case of shared output, provision of the identifiers may be at the end, after actual readout, see e.g. Action 508, of pixel values of all WAM row positions but before readout of pixel values relating to a next exposure of the image sensor. See below for separate examples involving several exposures.

There may e.g. be an image sensor row address associated with each pixel, e.g. in an associated memory, such as a "bit memory" or similar, and that is used as the image sensor row position identifier. In case of pixel group of more than one pixel, e.g. in case of binning, explained below, it may be predetermined or predefined which pixel of the group, e.g. always the lowest or highest, that will be used to represent the group.

Action 508

In some embodiments, the image sensing device 433, or other device(s), is reading out said pixels values provided for parallel readout, i.e. the device(s) performing the embodiments is also performing the actual readout, not only providing the pixel values so that the parallel readout is possible.

That is, said pixel values that were provided for parallel readout are here being readout in parallel. The readout may be via image sensor columns using the same means as when pixels having the same physical image sensor row position are readout, i.e. as for conventional readout.

The present action may be performed by the same or a separate device that performed the previous actions. As already mentioned, the previous actions may be performed by an image sensing or image sensor device or circuitry, e.g. the image sensing deice 433, comprising the image sensor as such, e.g. the image sensor 431, integrated in a single device or unit, such as a chip. The present action may be performed by the same device or a separate device for operating and/or operating with such image sensor device, e.g. chip. The separate device may comprise A/D converters. Note that a single device with additional functionality beside the image sensor as such may sometimes still be referred to as an image sensor in the technical field.

The present action may be repeated, as indicated above, in said sequence of parallel readouts, whereby pixel values of pixels of all WAMs are readout, one WAM position or row at a time. Any A/D conversion may also be performed sequentially so that analogue pixel values, present at the columns of the image sensor for one and the same first WAM position pixel values are A/D converted in parallel to corresponding digital pixels values before next parallel readout, this time of second WAM position pixel values, e.g. pixel values of the next WAM position. This means that pixel values from each parallel readout can be stored digitally and when all WAM width number of parallel readouts have been performed sequentially there are digital pixel values for all WAM pixels available for further processing, after only WAM width number of parallel readouts as explained above. The digital pixel values may then be further processed in order to identify a light intensity center position with sub-pixel resolution, e.g. by a peak finding algorithm, according to some prior art method suitable for this.

In some embodiments, respective pixel group corresponds to a binning group of two or more pixels and said analogue pixel value of the respective pixel group is a binned pixel value of the pixels of the pixel group. This is exemplified and explained in some further detail below in relation to FIGS. 6A-B.

With a binning group of 2 pixels, a WAM width of 31 such groups covers 62 pixels. The respective WAM will in case of binning be in the "binning resolution". With binning and thus "combined pixels" there will be fewer readouts for the same region, i.e. same image sensor coverage, since the readout is per binning group. For example, assume that without binning there is a WAM of 11 pixels, thus requiring 11 sequential readouts. With binning of 3 pixels, a WAM width of 5 binning groups, i.e. 15 pixels, covering a larger sensor area than 11 pixels, will still only require 5 sequential readouts.

Binning can also increase speed since the respective pixel group the analogue pixel value with binning, thanks to the binning, can reach or pass said threshold pixel value faster, i.e. binning can speed up said identification of the respective pixel group, i.e. the "winner" in respective image sensor column.

In practice, binning groups of 2, 4 and perhaps up to 8 may be of interest, but higher than that may result in too coarse resolution for identifying a useful "winner" group.

In some embodiments, parallel readouts, such as in Action 506, for different WAM positions, e.g. for different WAM rows, are provided sequentially in a sequence, the length of the sequence corresponding to said WAM width, where respective such parallel readout is associated with a respective WAM position. For example, as illustrated in FIG. 3E, first parallel readout from all columns 352-1 . . . M for the first WAM row 364-1 is provided, then from all columns 352-1 . . . M for the second WAM row 364-2, etc. The actual readout as in Action 508 may accordingly be sequentially performed.

In some embodiments, after provision of said sequence of parallel readouts, said pixels of said at least said region of the image sensor 431 are reset and exposed a second time during a second exposure. As a result, the exposed pixels attain new second analogue pixel values, respectively, corresponding to sensed light during said second exposure. Refer to said respective WAM, e.g. respective WAM 358, as first respective WAM. In these embodiments, new, second, respective WAM in said respective image sensor column of said region are provided based on said first respective WAM. It is then provided, for parallel readout, based on said second exposure, pixel values of pixels associated with the same WAM position in respective second WAM. This is exemplified and explained in some further detail below in relation to FIG. 7.

There is thus a dual exposure in these embodiments but without new, second WAMs provide as the first WAMs, instead the first WAMs of the first exposure may be "reused" to some extent. This saves time and/or may be of interest to apply when it is known that there has been no or a sufficiently small, and/or known, change in position of an object, e.g. the object 420, between the exposures and information about this same or almost same position on the object is desirable to retrieve from a second exposure, e.g. using other light than during the first exposure.

Said respective second WAM is in some embodiments the same as the respective first WAM both in width and regarding where they are positioned on the image sensor, i.e. covering the same image sensor pixels as the first WAMs, or in other words, may not change in this regard between the exposures. In some embodiments, there is instead a predefined or predetermined image sensor row offset for respective second WAM compared to the respective first WAM, and/or a predefined or predetermined change in the WAM width. For example, the second WAM may be offset to compensate for movement of an object between the first and second exposures. Another example is that the second WAMs may be positioned with same center positions as the first WAMs but have wider WAM width to provide some margin to be sure that any new respective intensity center and the first WAM width around that will, or will likely, be covered by respective second WAM. This means that some more WAM positions are provided for readout, but without having to identify any new pixels or groups of pixels, that, as in Action 503, during exposure first reach the threshold value, and no need to provide or read out any new sensor row position identifier, as in Action 507, associated with the respective second WAM since it is the same as for respective first WAM. The actual center pixel per column for the wider second WAMs can later be identified digitally and digital pixel values of pixels within the first WAM width can be used to find the actual peak position in sub pixel resolution by a peak finding identifying algorithm.

Yet another example is that the first WAMs cover more image sensor rows than the second WAMs that thus has a WAM width that covers fewer image sensor rows. For example, if binning as described above is used for the first WAMs, then the second WAMs, e.g. without binning, may be positioned where the binning groups for first WAMs were located that during the first exposure first reached the threshold value.

In some embodiments, if multiple pixel groups in same image sensor column, e.g. the same of any of the column 352-1 . . . M, of said region have analogue pixel values, respectively, indicated to at the same time having reached or exceeded said threshold pixel value, only one of the multiple pixel groups is selected according to predefined one or more criteria as the identified respective pixel group for this image sensor column.

For example, It may be predetermined or predefined that it is the "winner" with lowest or highest image sensor row position that is selected, or some other criteria that results in only one "winner" per column in the region may be applied. In theory it is very unlikely that two pixels exactly the same time reach the same threshold value, but when practically implementing embodiments herein as described above, it may happen that the implementation indicates that two or more have reached the threshold at the same time and this may need to be handled. When this problem has been realized, handling it as above is a simple solution that can be implemented relatively simple as well. A way how this can be implemented in hardware is exemplified below in relation to FIG. 9.

Figure 6A:
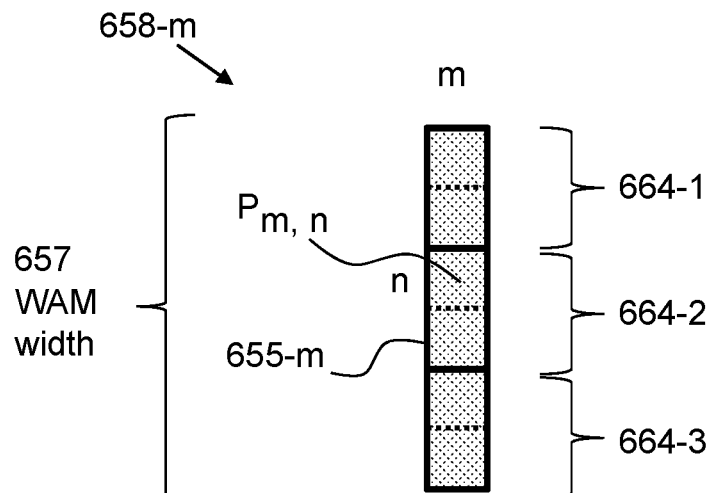
FIG. 6A schematically shows a WAM for pixel groups of 2 pixels and a 3 pixel group WAM width for use in a column m.

FIG. 6A schematically shows a WAM 658-$m$ for column m for use with a pixel groups, e.g. binning group, of 2 pixels. A WAM width 657 corresponds to 3 pixel groups. The example in the figure and WAM 658-$m$ may be compared with the example of FIG. 3C and WAM 358-$m$. The difference is thus that instead of pixel group of 1 pixel, it is now 2 pixels and another WAM width. Since it is 2 pixels per group, the WAM width 657 of 3 groups, corresponds to a width of 6 pixels.

The WAM position is in the pixel group, e.g. binning, resolution, here 2, and thus there are 3 WAM positions, or WAM rows, 664-1 . . . 664-3.

Similarly as in the example of FIG. 3C, the WAM 658-$m$ is to be centered around the pixel group in column m identified as the "winner" in that column, i.e. with the binned pixel value that during the exposure was first in the column to reach or pass the threshold value. In other words, the respective WAM center position is in tis example to be located on pixel group, in respective column, identified as "winner" pixel group.

Figure 6B:
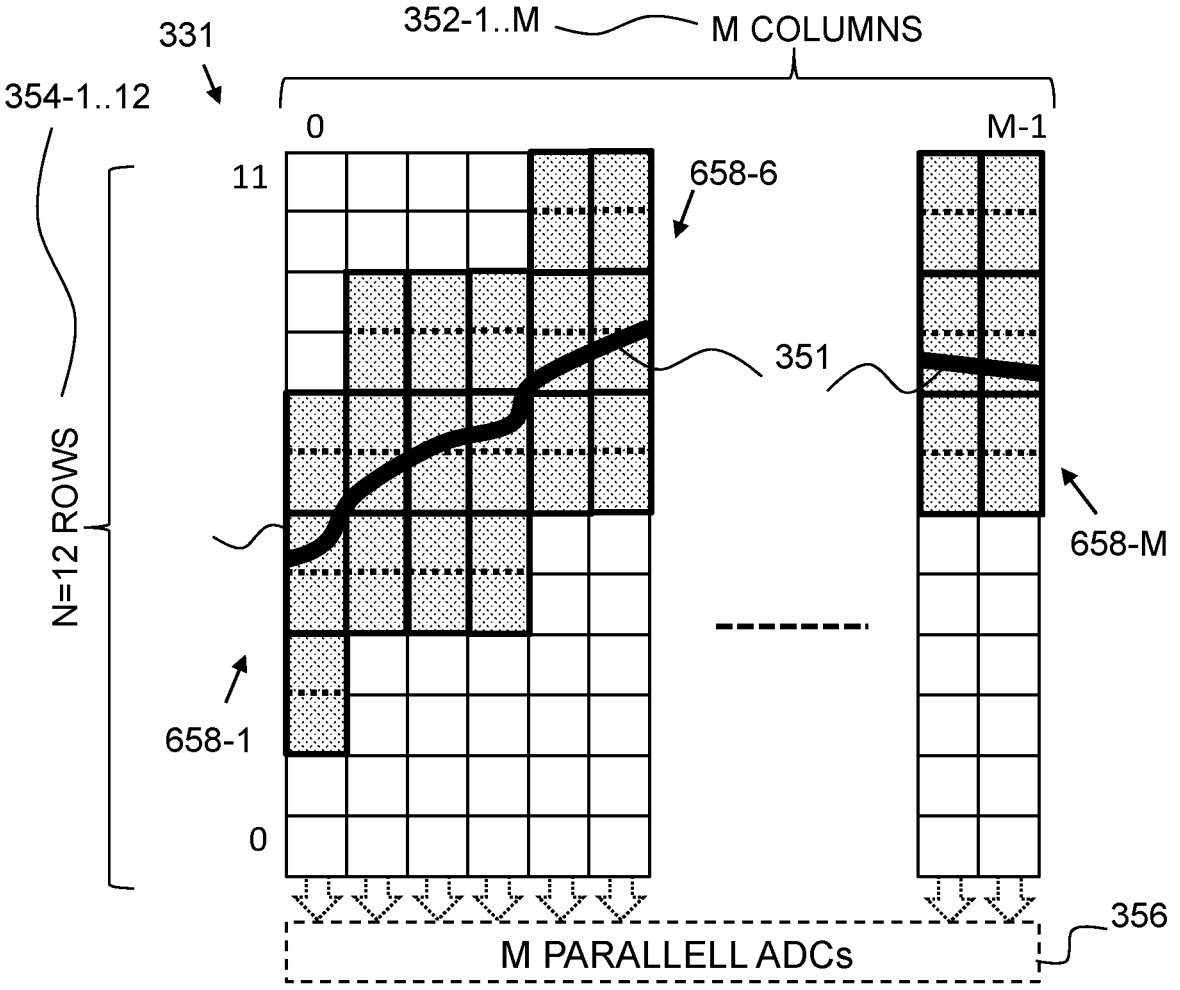
FIG. 6B schematically shows example when WAMs as in FIG. 6A are applied around pixels detected as in FIG. 3B.

FIG. 6B schematically shows an example when WAMs as in FIG. 6A are centered on pixel groups identified as in FIG. 3B. FIG. 6B may be compared with FIG. 3D to see the difference in WAMs although the intensity line 351 and the image sensor 331 etc. are the same. In FIG. 6B it is shown WAMs, also here one per column, i.e. a respective WAM 658-$m$ for m=1 . . . M, but centered on the identified "winner" pixel group instead of pixel in respective column m. There is also in this case one WAM 658 per column.

Figure 7:
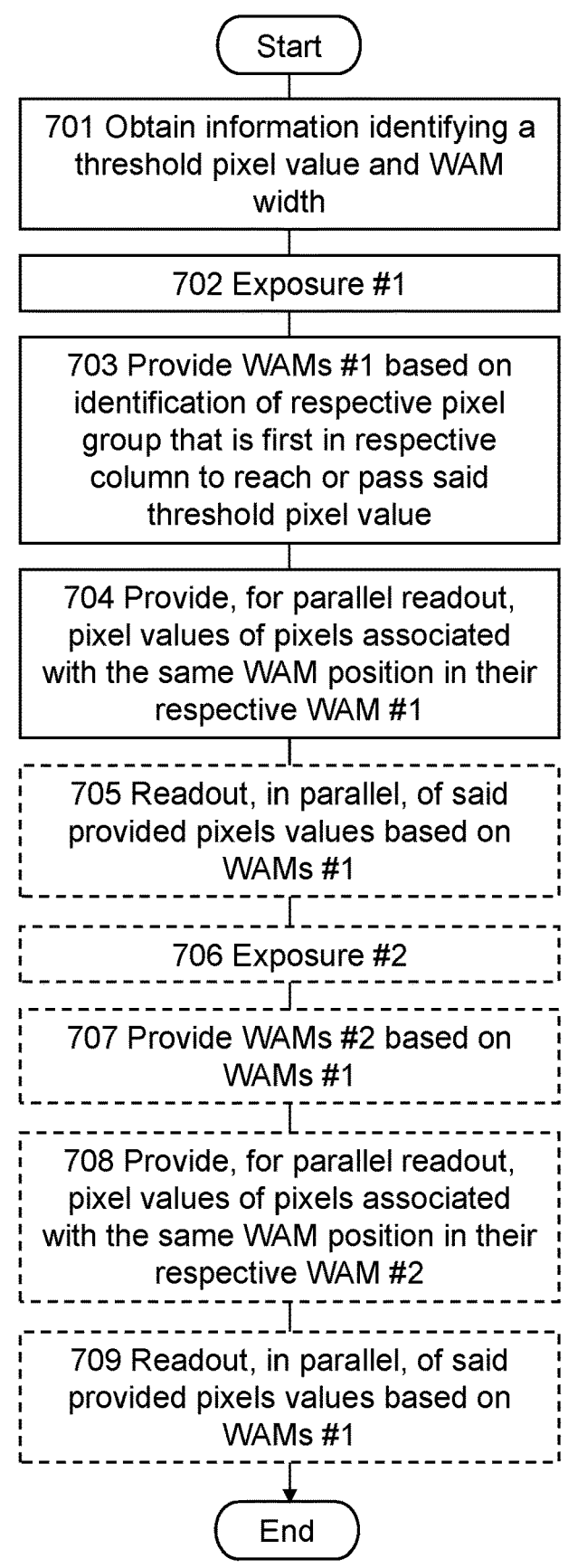
FIG. 7 is a another flowchart for schematically illustrating some embodiments of a method according to embodiments herein involving dual exposure.

FIG. 7 is a another flowchart for schematically illustrating some embodiments of a method, according to some embodiments herein, involving dual exposure. What is shown is an example of some embodiments already mentioned and discussed above in relation to FIG. 5. The example may be considered an extension of the method and actions shown in FIG. 5 and applicable to some embodiments. For example, Actions 701-702 may be or correspond to Actions 501-502. The exposure relating to Action 502 is considered a first exposure, i.e. exposure #1, in the context of the embodiments relating to FIG. 7. Action 703 may fully or partly correspond to Actions 503, 505.

The WAMs according to Actions 503, 505 are considered first WAMs, i.e. WAMs #1, in the context of embodiments relating to FIG. 7. There may also be actions, although not shown in FIG. 7, corresponding to one or more of Actions 504, 507, 509. Actions 704-705 may be or correspond to Actions 506, 508, respectively.

The actual extension relates to Actions 706-709. As in the case for some embodiments discussed above in relation to FIG. 5, before the extension with actions as described below are performed, all pixels values of pixels of WAM #1 are to be read out, since the first action of the extension is Action 706 that is about a second exposure #2 that typically will remove pixel values in the image sensor resulting from the first exposure #1. That is, said parallel readouts for different WAM positions, e.g. for each one of 364-1 . . . 5 or of 664-1 . . . 3, may first be provided sequentially in a sequence of such parallel readouts, each associated with a WAM #1 position to read out all pixel or pixel group values relating to WAMs #1. The length of the sequence correspond to the WAM #1 width, e.g. 5 in case of WAM width 357 or 3 in case of WAM width 657. Respective such parallel readout is thus associated with a respective WAM #1 position, e.g. the first parallel readout is associated with WAM #1 position 364-1 or 664-1, the second parallel readout with WAM #1 position 364-2 or 664-2, etc.

Note that similar to the actions of FIG. 5, the actions relating to FIG. 7 may be taken in any suitable order and/or be carried out fully or partly overlapping in time when this is possible and suitable.

Action 706

After provision of said sequence of parallel readouts, said pixels of said at least said region of the image sensor are reset and exposed a second time during a second exposure, i.e. exposure #2, whereby the exposed pixels attain new second analogue pixel values, respectively, corresponding to sensed light during said second exposure. The second exposure may be during a second exposure time that may be the same, longer or shorter than the first exposure time, depending on the circumstances and/or reasons for the second exposure.

Action 707

It is provided second, respective WAM in said respective image sensor column of said region, e.g. in each one of columns 352-1 . . . M, based on said first respective WAM.

That is, there are no second WAMs in this case that are provided as the first WAMs, i.e. no new identification of pixel or pixel group that is the "winner" etc, instead the WAMs of the first exposure are "reused" to some extent. As already mentioned above, the second WAMs may be the same as the first WAMs, or may have a change in WAM width and/or position in the image sensor column, e.g. regarding where the WAM center is located.

Action 708-709

These actions may correspond to Actions 506, 508, with e.g. only change that it is now the second WAMs instead of the first WAMs that are used and the pixel values are resulting from the second exposure instead of the first exposure. Hence, in some embodiments when e.g. the second WAMs are the same as, or wider and covering a least the first WAMs, the same pixels of the sensor may be read out but from another, the second, exposure. The pixel values from the second exposure may result from reflection of light from the same or substantially the same location on an object, e.g. the object 420, as during the first exposure. This way new additional information about the object from also other light can be provided and, thanks to embodiments herein, with fewer readouts than conventionally would be needed.

Figure 8:
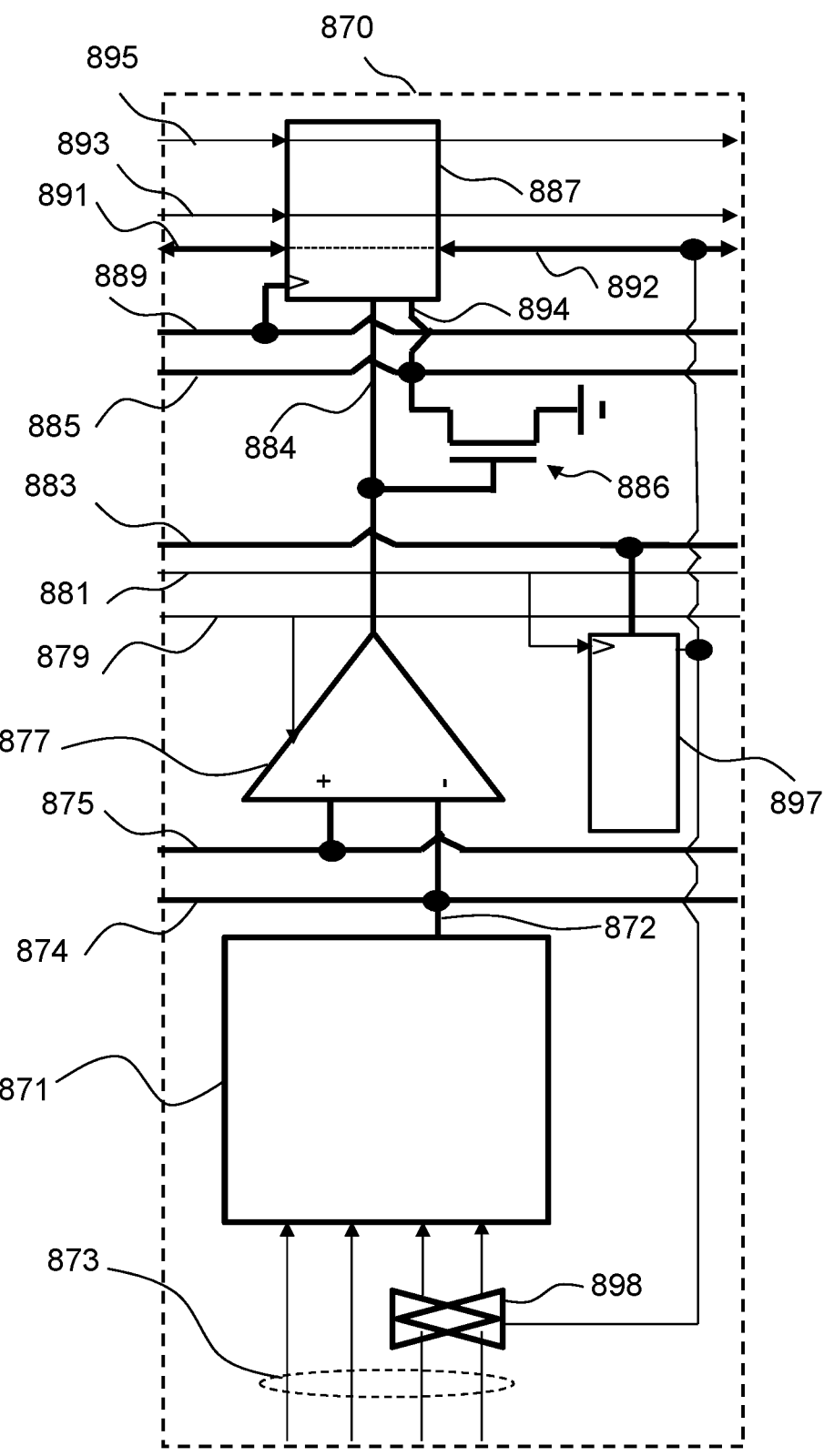
FIG. 8 is a schematic block diagram showing an example of how respective pixel of an image sensor can be implemented to support and for carrying out some embodiments herein.

FIG. 8 is a schematic block diagram showing an example of how a respective pixel element 870 of an image sensor, e.g. the image sensor 331 or 431, may be implemented to support and for carrying out some embodiments herein. The pixel element 870 may thus e.g. correspond to any one of the pixels, e.g. $P_{m,n}$, of the image sensor 331 as shown in FIG. 3.

What is schematically shown is a light sensing element 871 of the pixel element 870 with associated additional circuitry. The light sensing element 871 and a connected pixel bus 874, e.g. corresponding to a column of the image sensor 331, may be as in the prior art. In the following, focus will be on the additional circuitry, its functionality and how the additional circuitry participates in supporting and/or implementing the actions discussed above.

The additional circuitry comprises a comparator 877 with a first input thereof connected to a threshold line 875 that may be shared with other pixel elements and a second input thereof connected to an output of the light sensing element 871 where an analogue pixel value corresponding to sensed light, in the form of a pixel output voltage, is output. Said threshold value, as obtained in Action 501, may be provided and available through the threshold line 875. As should be realized, the comparator is an example of how it can be detected that the pixel value during exposure has reached or passed the threshold value, which makes a comparator output 884 flip, e.g. go high or turn to a "1". The comparator 877 and how it is used here is thus an example of an implementation relating to Action 503. The comparator 877 also has an input for its reset connected to and controlled via a comparator reset line 879 that may be shared with other pixel elements. The comparator output 884 connects to a global-OR net that in the figure comprises a global-OR line 885 and a global-OR switch 886. The global-OR line 885 is shared with other pixel elements of the same column. The comparator output 884 also connects to a data input of a D flip-flop 887, also further described below.

The additional circuitry further comprises a D flip-flop 887 interconnected with corresponding D-flip-flops in neighboring pixel elements in the same column. They are involved in implementation of WAM positioning and readout, relating to for example Actions 505, 506, 508. This is further described below. The D flip-flop 887 has a clock input connected to a D flip-flop clock line 889 for providing a clock signal to the D-flip flop 887 and that may be shared with D flip-flops of other pixel elements. Moreover, the D flip-flop has a data input connected to the comparator output 884 for setting the D flip-flop to a value, e.g. setting it to "1" when the threshold value has been reached or passed. Further, the D flip-flop 887 has a first data input/output 891 that is connected to a corresponding D-flip-flop (not shown) of one of the pixel element's 870 two neighboring pixel elements in the column. The D flip-flop 887 further has a second data input/output 892 connected to a yet another corresponding D-flip-flop (not shown) of the second of said two neighboring pixel elements in the column. Note that when one of the first and second data input/outputs 891, 892 is operating as an input, the other is operating as an output, and vice versa. This is controlled via a D flip-flop shift direction line 895 and for use when the D flip-flop 887 is operating as a shift register.

There is further a D flip-flop reset line 893 connected to a reset input of the D flip flop 887 for resetting the D flip flop 887. The D flip-flop reset line 893 may be shared with corresponding D flip-flops of other pixel elements. The D-flip flop 887 also has a lock control input 894 connected to the global-OR net so that when the global-OR net switches, due to that a pixel in the column has reached or passed the threshold, the value that the D-flip flop 887 has on its data input, i.e. the comparator output 884, becomes "locked", meaning that the D flip-flop 887 thereafter, until e.g. a next reset, will no longer be affected by what is on the data input, i.e. no longer be affected by what is on the comparator output 884.

Shown is also said D flip-flop shift direction line 895 available to the D flip-flop 887 that also may be shared with other pixel elements, e.g. in the same column, and is for being able to control and shift direction of how the D flip-flops in the column operate when they operate as shift registers, e.g. in an up or down direction of the column (left-right in the figure), i.e. for switching input-output direction, thereby enabling to shift and move position within a WAM and indicate one WAM position for readout at the time. This is further described below. The D flip-flop 887 and corresponding D-flip flops of the other pixels in a column are for operating as shift registers after the global-OR net of the column has locked the data input of the D flip-flops, as should be realized from the below text. In practice, this is after the exposure and used for the provision of pixels values for read out.

Basically, the data input of the D flip-flop 887 that is connected to the comparator output 884 operate as input to and for setting the value of the D flip-flop 887 during the exposure. After the exposure, the D flip-flop 887 operates as shift register shifting data from input to output using the first and second data input/outputs 891, 892 and do not care about the comparator output 884.

At start of exposure as in Action 502, the light sensing element 871, the comparator 877, the D flip-flop 887 may be reset, and the global-OR net be pre-charged (pre-charge not shown). During the exposure pixel voltages output from light sensing elements in the same columns as the light sensing element 871 are monitored by comparators corresponding to the comparator 877. The first pixel in the column to reach the threshold value corresponding to a voltage on the threshold line 875, in the following assumed to be the pixel corresponding to the pixel element 870 shown in the figure, makes the comparator 877 flip and generate a "1" on the global-OR net, whereby the global-OR switch 886 generate a lock-signal to the D-flip flop 887 via its lock control input 894. The global-OR net makes all comparators' present output value, e.g. "0" or "1", be "locked" to their D-flip flops but only one per column, corresponding to one row position, should by then be a "1", indicating the row in the column where the pixel reached the threshold value first. In other words, this is an example of implementation of Action 503. See also the example of FIG. 9, discussed below, for an example for taking of a case if it happens to be two or more "1", i.e. indicated "winners", in the same column.

After some time, the exposure time ends and all light sensing elements, including the light sensing element 871, have attained their respective pixel value after exposure. At this time, the single "1" in each column is thus at the pixel element, e.g. the pixel element 870, that first reached or passed the threshold in the column, and thus indicates the row position in the column of this pixel. For example, the D flip-flop first input/output 891 may hold a "1". As explained above, the pixel that first reached or passed the threshold value is further associated with a position, e.g. the center position, of the WAM to be used. Said single "1" may therefore suitably be shifted upwards "half" the WAM width, i.e. half the WAM size by means of the D flip-flops in the column, using the D flip-flop shift direction line 895, D flip-flop clock line 889 and the first and second data input/outputs 891, 892. In practice "half" may mean a shift that is actually (WAM width−1)/2 if a WAM width that is symmetrical around the center position is used, and thus there being an odd number WAM width. After the shift, the "1" may thus indicate the first WAM position of the WAM in this column, e.g. the WAM position, or WAM row, 364-1.

In the shown example, the second data input/output 892 is connected to a transmission gate 898 that is arranged so that when the second data input/output 892 is "1", such as after the "1" has been shifted there since it is time to read out the pixel value of the WAM position associated with pixel element 870, the light sensing element receives control signals so its pixel value can be provided to the pixel bus 874, be read out and then be A/D converted etc. Suitable one(s) of control lines 873 to the light sensing element may be controlled by the transmission gate 898 but there are typically also other control lines that are global, e.g. regarding reset, to trigger read, etc.

Assume that the "1" was shifted to the first WAM position in the column and that a pixel element there, similar as the pixel element 870, provided its pixel value for readout to the pixel bus 874. Next, the "1" may be shifted again but now "down" one position so that the next WAM position and the pixel values of the pixel at this WAM position can be and is read out, etc. until pixels of the whole WAM have been read out, i.e. for all positions of the WAM and according to the WAM width. A similar procedure is going on for other columns in parallel so that pixel values of same WAM position, e.g. same WAM row, but of different image sensor columns and also of different image sensor rows, can be read out in parallel as described for embodiments herein.

It should be realized from the above that the WAM width should determine how the D flip-flops are controlled and shifted by means of the D flip-flop shift direction line 895 and the D flip-flop clock line 889.

Of course, there is no need to start from "top" of respective WAM and shift down as in the example above, one could as well start from the "bottom" and shift up, or shift through, and read from, the WAM positions in any other order, although the order to be used should be predetermined or predefined.

Moreover, as discussed in relation to for example actions 504, 507 and 509, it is of interest to be able to know and read out an image sensor row position for each WAM, in practice for at least one certain WAM position, such as for the center position, i.e. the pixel in the column that first reached or passed the threshold value. The figure gives an example of how this can be accomplished for the pixel element 870. The pixel element 871 comprises a row position memory 897, or access to such, that may be a read only memory and can correspond to a hard coded bit number, e.g. of N bits, that identifies the image sensor row position of the pixel element 870. The row position memory 897 is connected to a row number bit bus 883 where the bit number can be output bit by bit, i.e. serially, using a clock signal connected to the row position memory 897 via a row number clock signal line 881 that may be shared with other pixel elements. The output of the bit number may be controlled so that the output is taking place for the pixel in the column indicated by said "1", and for example so that the output is only made for one pixel of respective WAM, e.g. the pixel in the column that was involved in first reaching or passing the threshold value, thus corresponding to the center position of the WAM in that column.

An example alternative to the row position memory 897 may be based on feeding address bits from row lines to the pixel elements.

Figure 9:
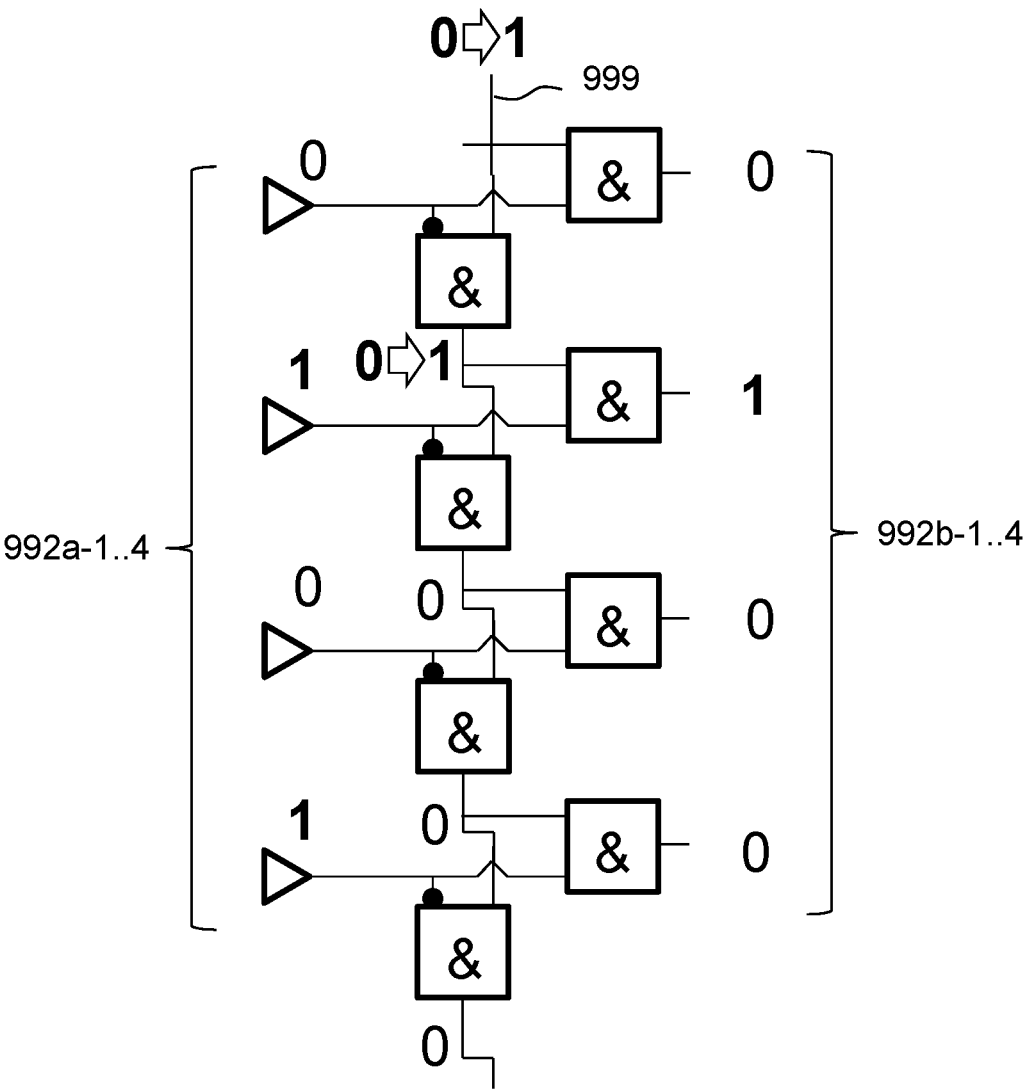
FIG. 9 is a schematic block diagram for illustrating how an arbiter functionality related to some embodiments can be implemented in hardware by logic.

FIG. 9 is a schematic block diagram for illustrating how an arbiter functionality related to some embodiments can be implemented in hardware by means of logic. This is an example of a relative simple solution in case there can be more than one pixel, e.g. corresponding to the pixel element 870 in FIG. 8, per column with a pixel indicated as "winner", for example by a "1" in the column, as in the example of FIG. 8, i.e. more than one pixel indicated as first to have reached or passed the threshold value in the same column. The figure and example is quite self-explanatory through the logic elements and transitions shown, with the solution being based on a serial connection of AND-gates in a sequence. As can be seen in the example, it is assumed that two out of the four input lines 992a1 . . . 4, on the left, have been set to "1", thus indicating that both was first to reach or pass the threshold value. The input values on input lines 992*a*-1 . . . 4 are "0101" in the example and may e.g. correspond to values output by D flip-flops, such as the D flip-flop 887, on D flip-flop output lines, e.g. the D flip-flop output line 892. A control line 999 can be used after exposure, e.g. triggered by the end of the exposure, to activate the function by being set to "1". As shown in the figure, as a result of the control line 999 switching from "0" to "1", the output of the first AND-gate in the sequence, that precedes the first of the input lines with "1", here input line 992*a*-2, will also switch from "0" to "1", which in turn prevents any input line occurring thereafter in the sequence to output anything else than "0". As a result, there are input lines 992*a*1 . . . 4 with only one "1" and the output values on output lines 992*b*-1 . . . 4 become "0100" in the example, i.e. only one indication of a "winner". As realized, corresponding functionality may be accomplished by small modifications an/or other logic elements, and in case the functionality need not be implemented in hardware, there are even more possibilities to select which of multiple row indications in a column to select so there is only one that readouts are based on. Alternatives may for example include to select the first or last "winner" indication in a column, or the one that is closest to a "winner" indication in a neighboring column, or make a random selection of "winner" indication in the column.

Figure 10:
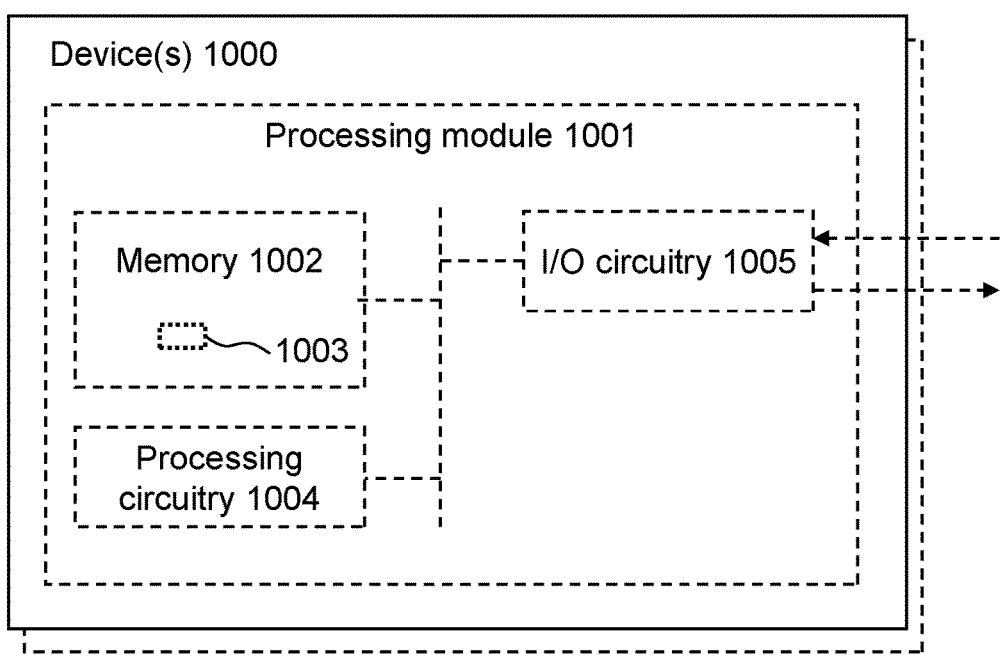
FIG. 10 is a schematic block diagram for illustrating embodiments of how one or more devices may be configured to perform the method and actions discussed in relation to FIG. 5.

FIG. 10 is a schematic block diagram for illustrating embodiments of how one or more devices 1000, i.e. device(s) 1000, may be configured to perform the method and actions discussed in relation to FIG. 5 and/or FIG. 7. The device(s) 1000 may correspond to devices(s) already mentioned in the above for performing embodiments herein, such as for performing the method and/or actions described above in relation to FIG. 5 and FIG. 7. Hence, the device(s) 1000 is for said provision of pixel values for readout from at least said region of pixels of an image sensor, e.g. the image sensor 431.

The device(s) 1000 may comprise a processing module 1001, such as processing means, one or more hardware modules, including e.g. one or more processing circuits, circuitry, such as processors, and/or one or more software modules for performing said method and/or actions.

The device(s) 1000 may further comprise memory 1002 that may comprise, such as contain or store, a computer program 1003. The computer program 1003 comprises 'instructions' or 'code' directly or indirectly executable by the device(s) 1000 to perform said method and/or actions. The memory 1002 may comprise one or more memory units and may further be arranged to store data, such as configurations, data and/or values, involved in or for performing functions and actions of embodiments herein.

Moreover, the device(s) 1000 may comprise processing circuitry 1004 involved in processing and e.g. encoding data, as exemplifying hardware module(s) and may comprise or correspond to one or more processors or processing circuits. The processing module(s) 1001 may comprise, e.g. 'be embodied in the form of' or 'realized by' the processing circuitry 1004. In these embodiments, the memory 1002 may comprise the computer program 1003 executable by the processing circuitry 1004, whereby the device(s) 1000 is operative, or configured, to perform said method and/or actions.

The device(s) 1000, e.g. the processing module(s) 1001, may comprise Input/Output (I/O) module(s) 1005, configured to be involved in, e.g. by performing, any communication to and/or from other units and/or devices, such as sending and/or receiving information to and/or from other devices. The I/O module(s) 1005 may be exemplified by obtaining, e.g. receiving, module(s) and/or providing, e.g. sending, module(s), when applicable.

Further, in some embodiments, the device(s) 1000, e.g. the processing module(s) 1001, comprises one or more of obtaining module(s), exposing module(s), identifying modules(s), associating module(s), providing module(s), storing module(s), resetting module(s), reading module(s), selecting module(s), as exemplifying hardware and/or software module(s) for carrying out actions of embodiments herein. These modules may be fully or partly implemented by the processing circuitry 1004.

Hence:

The device(s) 1000, and/or the processing module(s) 1001, and/or the processing circuitry 1004, and/or the I/O module(s) 1005, and/or the obtaining module(s), are operative, or configured, to, obtain said information indicating the threshold pixel value and the WAM width.

The device(s) 1000, and/or the processing module(s) 1001, and/or the processing circuitry 1004, and/or the exposing module(s), are operative, or configured, to, expose said pixels of at least said region of the image sensor whereby the exposed pixels attain said analogue pixel values, respectively.

The device(s) 1000, and/or the processing module(s) 1001, and/or the processing circuitry 1004, and/or the identifying module(s), are operative, or configured, to identify said respective group of said one or more pixels in respective image sensor column of said region whose analogue pixel value during said exposure was first in said respective column to reach or pass said threshold pixel value.

The device(s) 1000, and/or the processing module(s) 1001, and/or the processing circuitry 1004, and/or the associating module(s), are operative, or configured, to associate said identified respective pixel group with said respective certain WAM position of the respective WAM in said respective image sensor column of said region.

The device(s) 1000, and/or the processing module(s) 1001, and/or the processing circuitry 1004, and/or the I/O module(s) 1005, and/or the providing module(s), are operative, or configured, to, provide, for parallel readout per WAM position and based on said exposure, said pixel values of pixels associated with the same WAM position in their respective WAM.

In some embodiments, the device(s) 1000, and/or the processing module(s) 1001, and/or the processing circuitry 1004, and/or the storing module(s), are operative, or configured, to store said respective image sensor row position identifier identifying the image sensor row position of the identified respective pixel group.

In some embodiments, the device(s) 1000, and/or the processing module(s) 1001, and/or the processing circuitry 1004, and/or the I/O module(s) 1005, and/or the providing module(s), are operative, or configured, to provide, for the readout in association with respective WAM, said stored respective sensor row position identifier associated with the respective WAM.

In some embodiments, the device(s) 1000, and/or the processing module(s) 1001, and/or the processing circuitry 1004, and/or the I/O module(s) 1005, and/or the providing module(s), are operative, or configured, to provide said parallel readouts for the different WAM positions sequentially in said sequence, the length of the sequence corresponding to said WAM width and with respective such parallel readout associated with respective WAM position.

In some embodiments, the device(s) 1000, and/or the processing module(s) 1001, and/or the processing circuitry 1004, and/or the resetting module(s), and/or the exposing module(s) are operative, or configured, to, after provision of said sequence of parallel readouts, reset said pixels of said at least said region of the image sensor and expose them said second time during said second exposure, whereby the exposed pixels attain said new second analogue pixel values, respectively.

In some embodiments, the device(s) 1000, and/or the processing module(s) 1001, and/or the processing circuitry 1004, and/or the I/O module(s) 1005, and/or the providing module(s), are operative, or configured, to provide said new, second, respective WAM in said respective image sensor column of said region based on said first respective WAM, and to provide, for parallel readout and based on said second exposure, the pixel values of the pixels associated with the same WAM position in said respective second WAM.

In some embodiments, the device(s) 1000, and/or the processing module(s) 1001, and/or the processing circuitry 1004, and/or the exposing module(s) are operative, or configured, to expose the pixels during the exposure to said light reflected from said object as part 3D imaging of the object based on light triangulation.

In some embodiments, the device(s) 1000, and/or the processing module(s) 1001, and/or the processing circuitry 1004, and/or the I/O module(s) 1005, and/or the reading module(s), are operative, or configured, to read out (508) said pixels values provided for parallel readout.

In some embodiments, the device(s) 1000, and/or the processing module(s) 1001, and/or the processing circuitry 1004, and/or the I/O module(s) 1005, and/or the selecting module(s), are operative, or configured, to, if said multiple pixel groups in the same image sensor column of said region have said analogue pixel values, respectively, indicated to at the same time having reached or exceeded said threshold pixel value, select said only one of the multiple pixel groups according to said predefined one or more criteria as the identified respective pixel group for this image sensor column.

Figure 11:
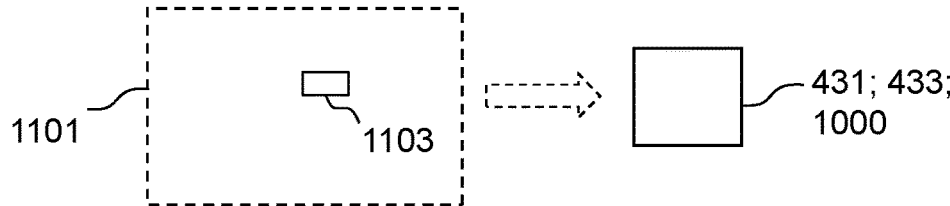
FIGS. 11-12 are a schematic drawings illustrating some embodiments relating to computer programs and carriers thereof.
Figure 12:
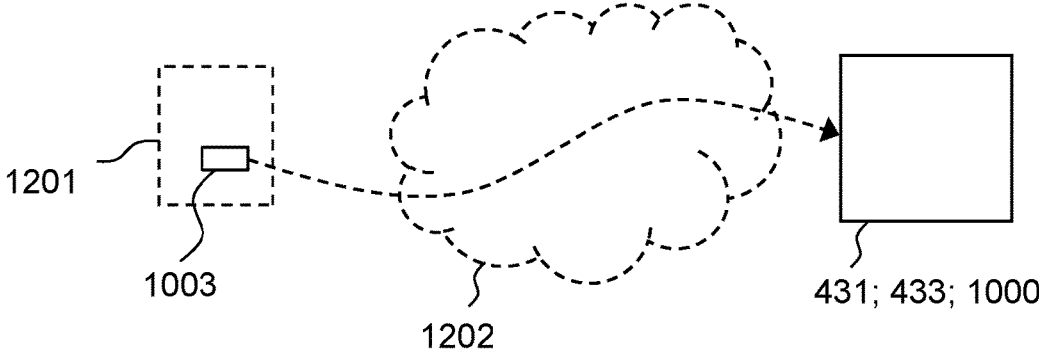

FIGS. 11-12 are a schematic drawings illustrating some embodiments relating to computer programs and carriers thereof.

FIG. 11 schematically illustrates a hardware synthesizing device(s) 1101 and a second computer program(s) 1103 that when loaded into and executed by the hardware synthesizing device(s) 1101 causes hardware, typically a chip, to be synthesized, and/or be configured, for example as the device(s) 1000 and/or the image sensing device or circuitry 433, that is, as in some embodiments herein and as described above. The chip being synthesized may e.g. be or be based on Field Programmable Gate Array (FPGA) technology or similar, or may e.g. be an Application Specific Integrated Circuit (ASIC). The hardware synthesizing device(s) 1101 may be a conventional one for hardware synthesizing for the type of hardware to be synthesized. The second computer program(s) 1103 may be based on some conventional programming language for hardware synthesizing, e.g. a suitable Hardware Description Language (HDL), such as Very High Speed Integrated Circuit Hardware Description Language (VHDL), or some other programming language adapted for or even specific for the type of hardware being synthesized. In some embodiments, e.g. when an ASIC is synthesized, the second computer program(s) 1103 may be or comprise binary file(s), and/or file(s) in some proprietary format, that describes the design of the ASIC to be produced for a manufacturer thereof and executable by device(s) part of a system used in manufacturing of ASICs. In such case the second computer program(s) 1103 may comprise both a program, e.g. in VHDL, that is executed on a computer and also a file produced by this for use in the ASIC manufacturing.

The hardware synthesizing device(s) 1101 may e.g. comprise a computer executing the second computer program(s) 1103 and one or more computer controlled devices connected to the computer that performs the hardware synthesizing as such, e.g. by operating on a FPGA-chip.

As used herein, a hardware being synthesized refers to that there is formed hardware, e.g. electronic circuit(s), by physically forming or generating such and/or causing physical, typically permanent, changes to synthesizable hardware unit or piece, e.g. a FGPA chip. This is clearly a difference to a more conventional computer program that executes on existing hardware, utilizing e.g. electronic circuits already in place. Such computer program controls hardware, e.g. in order to perform certain action, but do not generate the hardware.

The first computer program(s) 1003 was described above and may thus comprise instructions that when executed by e.g. the device(s) 1000, e.g. the processing module(s) 1001 and/or the processor(s) 1004, and/or the image sensing device 433 cause the device(s) to perform as described above, such as described in connection with FIG. 5 and/or FIG. 7. In other words, the first computer programs(s) 1003 may be of more conventional type relating to software.

FIG. 12 schematically illustrates that there in some embodiments is provided one or more carriers, or more specifically data carrier(s), e.g. computer program product(s), comprising the first computer program(s) 1003 and/or the second computer program(s) 1103, referred to as the computer program(s) 1003 and/or 1103 in the following. The carrier, or each one of said carriers, may be one of electronic signal(s), optical signal(s), radio signal(s), and a computer readable storage medium or media, e.g. a computer readable storage medium or media 1201 as schematically illustrated in the figure. The computer program(s) 1003 and/or 1103 may thus be stored on the computer readable storage medium or media 1201. By carrier may be excluded a transitory, propagating signal and the data carrier may correspondingly be named non-transitory data carrier. Non-limiting examples of data carrier(s) being a computer readable storage medium is a memory card or a memory unit, such a memory stick, a disc storage medium, or a mass storage device e.g. based on hard drive(s) or Solid State Drive(s) (SSD). The computer readable storage medium or media 1201 may be used for storing data accessible over a computer network 1202, e.g. the Internet or a Local Area Network (LAN). The computer program(s) 1003 and/or 1103 may furthermore be provided as pure computer program(s) or comprised in a file or files. The file(s) may be stored on the computer readable storage medium or media 1201 and e.g. available through download e.g. over the computer network 1202 as indicated in the figure, e.g. via a server. The server may e.g. be a web or File Transfer Protocol (FTP) server. The file or files may e.g. be executable files for direct or indirect download to and execution on the device(s) 1000, and/or the image sensing device 433, and/or the hardware synthesizing device(s) 1101, to e.g. configure or make some or all of them operative as described above. The file or files may also or alternatively be for intermediate download and compilation involving the same or another processor(s) to make them executable before further download and execution.

Note that any processing module(s) mentioned in the foregoing, e.g. in relation to FIG. 10, may be implemented as a software and/or hardware module, e.g. in existing hardware and/or as an ASIC a FPGA, or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

As indicated above, e.g. the device(s) 1000 and/or the image sensing device 433, may be implemented as and/or on an NSIP architecture or similar, e.g. as a chip implementation of a NSIP type of processor integrated with image sensor. At least some embodiments herein may be realized by programming, such as by installing the computer program 1003, on a programmable image sensor chip, e.g. NSIP chip, or for execution to control such chip.

Moreover, to facilitate implementation, e.g. based on a ASIC and making of a chip realizing the image sensing device 433, and that support high speed, some state-of-the-art CMOS imager technology that is based on and/or implements stacking of multiple silicon chips on top of each other may be used. This enables more logic near the pixels without compromising pixel performance by taking up valuable space and making each pixels active area small compared to the whole pixel area. Such stacking also allows optimizing one die for analogue pixel design and one for digital operations, giving better efficiency, and by using 2 dies of smaller area, lower cost is possible.

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors e.g. make the apparatus(es) 1500 to be configured to and/or to perform the above-described actions of embodiments herein.

Any identification by any identifier herein may be implicit or explicit. The identification may be unique in a certain context, e.g. for a certain computer program or program provider.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first value, second value, first device, second device etc., should as such be considered non-limiting and the terminology as such does not imply a certain hierarchical relation. Without any explicit information in the contrary, naming by enumeration should be considered merely a way of accomplishing different names.

As used herein, the terms "number" or "value" may in general refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "configured to" may mean that a processing circuit is configured to, or adapted to, by means of software or hardware configuration, perform one or more of the actions described herein.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. A method, performed by one or more devices, for provision of pixel values for readout from at least a region of pixels of an image sensor, wherein the method comprises:
    obtaining information indicating a threshold pixel value and a window at maximum, WAM, width corresponding to a number of pixels;
    exposing pixels of at least said region of the image sensor whereby the exposed pixels attain analogue pixel values, respectively, corresponding to sensed light during the exposure,
    identifying a respective pixel group of one or more pixels in respective image sensor column of said region whose analogue pixel value during said exposure was first in said respective column to reach or pass said threshold pixel value,
    associating said identified respective pixel group with a respective certain WAM position of a respective WAM in said respective image sensor column of said region and which respective WAM has said WAM width, whereby the respective WAM identifies, in respective column, a number of pixels corresponding to the WAM width covering the identified respective pixel group and neighboring pixels; and
    providing, for parallel readout per WAM position and based on said exposure, pixel values of pixels associated with the same WAM position in their respective WAM.

2. The method as claimed in claim 1, wherein the pixels corresponding to the WAM width are located around the identified respective pixel group in respective column.

3. The method as claimed in claim 1, wherein said respective certain WAM position of the respective WAM that said identified respective pixel group is being associated with, is a respective center position of the respective WAM.

4. The method as claimed in claim 1, wherein the method further comprises:
    storing a respective image sensor row position identifier identifying an image sensor row position associated with the identified respective pixel group;
    providing, for readout in association with respective WAM, said stored respective sensor row position identifier associated with the respective WAM, whereby the provided analogue pixel values of respective WAM becomes associated with and can be mapped to image sensor row positions in addition to sensor column positions.

5. The method as claimed in claim 1, wherein parallel readouts for different WAM positions are provided sequentially in a sequence, the length of the sequence corresponding to said WAM width, wherein respective such parallel readout is associated with a respective WAM position.

6. The method as claimed in claim 5, wherein after provision of said sequence of parallel readouts, said pixels of said at least said region of the image sensor are reset and exposed a second time during a second exposure, whereby the exposed pixels attain new second analogue pixel values, respectively, corresponding to sensed light during said second exposure, wherein said respective WAM is first respective WAM, wherein new, second, respective WAM in said respective image sensor column of said region are provided based on said first respective WAM, and wherein it is provided, for parallel readout and based on said second exposure, pixel values of pixels associated with the same WAM position in respective second WAM.

7. The method as claimed in claim 1, wherein respective pixel group corresponds to a binning group of two or more pixels and said analogue pixel value of the respective pixel group is a binned pixel value of the pixels of the pixel group.

8. The method as claimed in claim 1, wherein the pixels during the exposure are exposed to light reflected from an object as part 3D imaging of the object based on light triangulation.

9. The method as claimed in claim 1, wherein the method further comprises:
  reading out said pixels values provided for parallel readout.

10. The method as claimed in claim 1, wherein, if multiple pixel groups in same image sensor column of said region have analogue pixel values, respectively, indicated to at the same time having reached or exceeded said threshold pixel value, only one of the multiple pixel groups is selected according to predefined one or more criteria as the identified respective pixel group for this image sensor column.

11. One or more devices for provision of pixel values for readout from at least a region of pixels of an image sensor, wherein said one or more devices are configured to:
  obtain information indicating a threshold pixel value and a window around maximum, WAM, width corresponding to a number of pixels;
  expose pixels of at least said region of the image sensor whereby the exposed pixels attain analogue pixel values, respectively, corresponding to sensed light during the exposure,
  identify a respective group of one or more pixels in respective image sensor column of said region whose analogue pixel value during said exposure was first in said respective column to reach or pass said threshold pixel value,
  associate said identified respective pixel group with a respective certain WAM position of a respective WAM in said respective image sensor column of said region and which respective WAM has said WAM width, whereby the respective WAM identifies, in respective column, a number of pixels corresponding to the WAM width covering the identified respective pixel group and neighboring pixels, and
  provide, for parallel readout per WAM position and based on said exposure, pixel values of pixels associated with the same WAM position in their respective WAM.

12. The one or more devices as claimed in claim 11, wherein said one or more devices are further configured to:
  store a respective image sensor row position identifier identifying an image sensor row position of the identified respective pixel group; and
  provide, for readout in association with respective WAM, said stored respective sensor row position identifier associated with the respective WAM, whereby the provided analogue pixel values of respective WAM becomes associated with and can be mapped to image sensor row positions in addition to sensor column positions.

13. A non-transitory computer-readable medium storing instructions that, when executed by one or more processors cause one or more devices for provisioning of pixel values for readout from at least a region of pixels of an image sensor to perform operations comprising:
  obtaining information indicating a threshold pixel value and a window around maximum, WAM, width corresponding to a number of pixels;
  exposing pixels of at least said region of the image sensor whereby the exposed pixels attain analogue pixel values, respectively, corresponding to sensed light during the exposure,
  identifying a respective group of one or more pixels in respective image sensor column of said region whose analogue pixel value during said exposure was first in said respective column to reach or pass said threshold pixel value,
  associating said identified respective pixel group with a respective certain WAM position of a respective WAM in said respective image sensor column of said region and which respective WAM has said WAM width, whereby the respective WAM identifies, in respective column, a number of pixels corresponding to the WAM width covering the identified respective pixel group and neighboring pixels, and
  providing, for parallel readout per WAM position and based on said exposure, pixel values of pixels associated with the same WAM position in their respective WAM.

14. Imaging system comprising the one or more devices as claimed in claim 11 and a light source configured to illuminate an object with a specific light pattern of light and wherein the light source and the image sensor are arranged in relation to each other in the imaging system so that the specific light pattern of light, when reflected by the object, at least partly becomes incident light on the image sensor when said pixels are exposed, whereby said pixel values for readout comprise information convertible to information on three dimensional characteristics of the object regarding positions on the object that reflected the light and caused said incident light on the image sensor.

* * * * *